United States Patent
Yoshikawa et al.

(10) Patent No.: US 12,351,735 B2
(45) Date of Patent: Jul. 8, 2025

(54) CATIONIC ELECTRODEPOSITION COATING COMPOSITION

(71) Applicant: KANSAI PAINT CO., LTD., Amagasaki (JP)

(72) Inventors: Yuji Yoshikawa, Hiratsuka (JP); Daisaku Ito, Hiratsuka (JP); Hideki Iijima, Hiratsuka (JP)

(73) Assignee: KANSAI PAINT CO., LTD., Amagasaki (JP)

(*) Notice: Subject to any disclaimer, the term of this patent is extended or adjusted under 35 U.S.C. 154(b) by 927 days.

(21) Appl. No.: 17/604,351

(22) PCT Filed: Apr. 17, 2020

(86) PCT No.: PCT/JP2020/016957
§ 371 (c)(1),
(2) Date: Oct. 15, 2021

(87) PCT Pub. No.: WO2020/218215
PCT Pub. Date: Oct. 29, 2020

(65) Prior Publication Data
US 2022/0195210 A1   Jun. 23, 2022

(30) Foreign Application Priority Data

Apr. 25, 2019   (JP) .................................. 2019-083809
Apr. 25, 2019   (JP) .................................. 2019-083891

(51) Int. Cl.
| | |
|---|---|
| C09D 5/44 | (2006.01) |
| C08G 18/58 | (2006.01) |
| C08G 18/80 | (2006.01) |
| C09D 7/40 | (2018.01) |
| C09D 163/00 | (2006.01) |

(52) U.S. Cl.
CPC .......... C09D 5/4488 (2013.01); C08G 18/584 (2013.01); C08G 18/8064 (2013.01); C09D 5/4492 (2013.01); C09D 7/68 (2018.01); C09D 163/00 (2013.01)

(58) Field of Classification Search
CPC ...... C09D 5/4488; C09D 163/00; C09D 5/00; C09D 5/44; C09D 5/4407; C08G 18/584; C08G 18/8064
See application file for complete search history.

(56) References Cited

U.S. PATENT DOCUMENTS

| | | |
|---|---|---|
| 5,070,149 A | 12/1991 | Debroy et al. |
| 5,096,556 A * | 3/1992 | Corrigan .............. C09D 5/4492 |
| | | 523/403 |
| 5,135,970 A | 8/1992 | Honel et al. |
| 5,358,982 A | 10/1994 | Geisler et al. |
| 5,407,976 A | 4/1995 | Uhlianuk |
| 5,589,049 A | 12/1996 | Ott et al. |
| 2022/0195210 A1* | 6/2022 | Yoshikawa ............ C25D 13/20 |

FOREIGN PATENT DOCUMENTS

| | | | |
|---|---|---|---|
| EP | 0463474 A2 | | 1/1992 |
| EP | 3872139 A1 | | 9/2021 |
| JP | H0665791 A | | 3/1994 |
| JP | H06287267 A | | 10/1994 |
| JP | H07268063 A | | 10/1995 |
| JP | H08120494 A | | 5/1996 |
| JP | 2005097688 A | | 4/2005 |
| JP | 2017214572 A | | 12/2017 |
| JP | 2018159032 A | * | 10/2018 |
| JP | WO2018012604 A1 | | 4/2019 |
| WO | 9807770 A1 | | 2/1998 |
| WO | 2008091082 A1 | | 7/2008 |
| WO | 2018012604 A1 | | 1/2018 |

OTHER PUBLICATIONS

Reviewing New Chemical Under TSCA—High Molecular Weight Polymers in the New Chemicals Program. Published by the US EPA. Accessed Mar. 21, 2025. (https://www.epa.gov/reviewing-new-chemicals-under-toxic-substances-control-act-tsca/high-molecular-weight-polymers-new) (Year: 2024).*

Sample et al. ("High edge coverage electrocoat development for enhanced corrosion protection", 2007, Triservice Corrosion Conference, p. 1-8) (Year: 2007).*

(Continued)

*Primary Examiner* — Ciel P Contreras
*Assistant Examiner* — Kevin Sylvester
(74) *Attorney, Agent, or Firm* — Law Office of Katsuhiro Arai

(57) ABSTRACT

To provide a cationic electrodeposition coating composition manifesting excellent anticorrosive property at edges and in flat areas, along with finish quality, even in a state of thin film, as well as a coated article demonstrating these excellent coating film performances, the cationic electrodeposition coating composition includes an amino group-containing epoxy resin (A), a blocked polyisocyanate compound (B), and crosslinked epoxy resin particles (C), wherein the crosslinked epoxy resin particles (C) are contained by 0.1 to 40 parts by mass relative to the total mass in solids content of the amino group-containing epoxy resin (A) and blocked polyisocyanate compound (B); the number-average molecular weight of the crosslinked epoxy resin particles (C) is under 100,000; and/or the volume-average particle size of the crosslinked epoxy resin particles (C) is 30 to 1,000 nm.

20 Claims, No Drawings

(56) References Cited

OTHER PUBLICATIONS

Extended European Search Report (EESR) dated Jan. 2, 2023, issued for European counterpart patent application No. EP20794334.1 (11 pages).
International Search Report (ISR) mailed Jul. 7, 2020, issued for International application No. PCT/JP2020/016957. (3 pages).
International Preliminary Report on Patentability, dated Sep. 28, 2021, for corresponding international application PCT/JP2020/016957 (1 page).
Notification Concerning Transmittal of International Preliminary Report on Patentability, mailed Nov. 4, 2021, for corresponding international application PCT/JP2020/016957 (1 page).
Notification of Transmittal of Translation of the International Preliminary Report on Patentability, mailed Nov. 4, 2021, for corresponding international application PCT/JP2020/016957 (1 page).
Written Opinion of the International Searching Authority, mailed Jul. 7, 2020, for corresponding international application PCT/JP2020/016957 (4 page).

* cited by examiner

CATIONIC ELECTRODEPOSITION COATING COMPOSITION

CROSS-REFERENCE TO RELATED APPLICATIONS

This application is the U.S. National Phase under 35 U.S.C. § 371 of International Application PCT/JP2020/016957, filed Apr. 17, 2020, which claims priority to Japanese Patent Application No. JP2019-083809, filed Apr. 25, 2019 and No. JP2019-083891, filed Apr. 25, 2019. The International Application was published under PCT Article 21(2) in a language other than English.

TECHNICAL FIELD

The present invention relates to a cationic electrodeposition coating composition comprising an amino group-containing epoxy resin, a blocked polyisocyanate compound, and crosslinked epoxy resin particles.

BACKGROUND ART

Cationic electrodeposition coating compositions offer excellent coating workability and form coating films having good anticorrosive property, and are therefore widely used as base coats for conductive metal products that are required to have these performances, such as automotive bodies, automotive components, electrical equipment components, and other equipment, etc.

If the target object has sharp edges, the coating film may become thin at the edges when the coating material is heated and cured, resulting in poor anticorrosive property. Accordingly, when target objects having edges are to be coated, means for improving the anticorrosive property at the edges are required.

As a method for improving the anticorrosive property at edges, Patent Literature 1 discloses blending a polyacrylic amide resin in an electrodeposition coating material. It is considered that blending the aforementioned resin permits control of shrinkage caused by heating or allows the resin to interact with the coating film component to prevent a drop in edge covering due to flows; however, blending a soluble resin of high polarity can lead to poor anticorrosive property in flat areas.

Patent Literatures 2 and 3 disclose blending a cationic microgel dispersion (epoxy thickening agent) in an electrodeposition coating material. Blending the aforementioned resin permits prevention of flowing of the electrodeposition coating film at edges due to thermal flows; however, sufficient anticorrosive property may not be achieved at edges under severe corrosive conditions, especially severe corrosive conditions that last for an extended period of time.

BACKGROUND ART LITERATURE

Patent Literature

Patent Literature 1: Japanese Patent Laid-open No. 2017-214572

Patent Literature 2: Japanese Patent Laid-open No. 2018-159032

Patent Literature 3: Japanese Patent Laid-open No. Hei 7-268063

SUMMARY OF THE INVENTION

Problems to be Solved by the Invention

An object of the present invention is to provide a cationic electrodeposition coating composition offering excellent anticorrosive property at edges and in flat areas along with finish quality, even in a state of thin film, as well as coated articles demonstrating these excellent coating film performances.

Means for Solving the Problems

As a result of studying in earnest to achieve the aforementioned object, the inventors of the present invention found that the aforementioned object could be achieved by a cationic electrodeposition coating composition comprising an amino group-containing epoxy resin (A), a blocked polyisocyanate compound (B), and crosslinked epoxy resin particles (C), and thereby completed the present invention.

To be specific, the present invention provides the cationic electrodeposition coating composition, method for forming a cationic electrodeposition coating film, and coated articles that have been electrodeposition-coated by such method for forming a coating film, as described below:

[Item 1] A cationic electrodeposition coating composition comprising an amino group-containing epoxy resin (A), a blocked polyisocyanate compound (B), and crosslinked epoxy resin particles (C), wherein the cationic electrodeposition coating composition is characterized in that:

the crosslinked epoxy resin particles (C) are contained by 0.1 to 40 parts by mass relative to the total mass in solids content of the amino group-containing epoxy resin (A) and blocked polyisocyanate compound (B);

the number-average molecular weight of the crosslinked epoxy resin particles (C) as measured by the method below is under 100,000; and/or the volume-average particle size of the crosslinked epoxy resin particles (C) is 30 to 1,000 nm.

<Method for Measuring Number-Average Molecular Weight>

The crosslinked epoxy resin particles (C) were diluted with N,N'-dimethylformamide to 1% by mass in solids content concentration and let stand stationary for 24 hours at room temperature. Next, undissolved components were filtered out, and the number-average molecular weight was measured by gel permeation chromatography (GPC).

[Item 2] The cationic electrodeposition coating composition according to Item 1, characterized in that the percentage of undissolved components (crosslinked components) in the crosslinked epoxy resin particles (C) as measured by the method below was 10% by mass or higher.

<Method for Measuring Percentage of Undissolved Components (Crosslinked Components)>

The crosslinked epoxy resin particles (C) were diluted with N,N'-dimethylformamide to 1% by mass in solids content concentration and let stand stationary for 24 hours at room temperature. Next, undissolved components (crosslinked components) were filtered out using a GPC Maishori Disk filter (pore size: 0.2 microns), and the residues were dried under the conditions of 130° C.×3 hours and then measured for mass in solids content. The percentage (% by mass) of undissolved components (crosslinked components) can be obtained by the formula below:

Percentage (% by mass) of undissolved components
(crosslinked components)=A/B×100

A: Mass of filtration residues in solids content

B: Mass of diluted solution of crosslinked epoxy resin particles (C) of 1% by mass in solids content/100

[Item 3] The cationic electrodeposition coating composition according to Item 1 or 2, characterized in that the volume-average particle size of the crosslinked epoxy resin particles (C) is 100 nm to 800 nm.

[Item 4] The cationic electrodeposition coating composition according to any one of Items 1 to 3, characterized in that the absorbance of the crosslinked epoxy resin particles (C) at a wavelength of 400 nm, as measured by the method below, is 0.05 or higher.

<Method for Measuring Absorbance>

The crosslinked epoxy resin particles (C) were diluted with N,N'-dimethylformamide to 1% by mass in solids content concentration and let stand stationary for 24 hours at room temperature. Subsequently, their absorbance at a wavelength of 400 nm was measured with a spectrophotometer "U-1900" (product name, manufactured by Hitachi High-Technologies Corporation).

[Item 5] The cationic electrodeposition coating composition according to any one of Items 1 to 4, characterized in that the crosslinked epoxy resin particles (C) are a reaction product of an amino group-containing epoxy resin (C-1) and an epoxy resin (C-2).

[Item 6] The cationic electrodeposition coating composition according to Item 5, characterized in that the amino group-containing epoxy resin (C-1) is a reaction product of an epoxy resin (C-1-1) and an amine compound (C-1-2), and in that the amine compound (C-1-2) contains a ketiminated amine compound (C-1-2-1) by 2% by mol or higher but under 40% by mol.

[Item 7] The cationic electrodeposition coating composition according to any one of Items 1 to 6, characterized in that its high molecular fraction (peak area of molecular weight 100,000 or higher) is under 40%.

[Item 8] The cationic electrodeposition coating composition according to any one of Items 1 to 7, characterized in that the amino group-containing epoxy resin (A) is a reactant of a bisphenol A type epoxy resin and an amine compound.

[Item 9] A coating method for electrodeposition-coating a metal target object by immersing it in an electrodeposition coating material bath comprising the cationic electrodeposition coating composition according to any one of Items 1 to 8.

[Item 10] A method for manufacturing a coated article, including a step in which a coating film is formed by the coating method according to Item 9 and then heated and cured.

Effects of the Invention

The cationic electrodeposition coating composition proposed by the present invention offers excellent anticorrosive property at edges and in flat areas along with finish quality, especially good finish quality and anticorrosive property in a state of thin film, and it ensures good anticorrosive property at edges even under severe corrosive conditions. Furthermore, when consideration is given to its components, the cationic electrodeposition coating composition achieves good anticorrosive property at edges even under severe corrosive conditions that last for an extended period of time. Automotive bodies coated with the present invention will undergo less deterioration by corrosion after having been driven in an environment of sprayed snow-melting salt, especially after having been driven for a long period of time in an environment of sprayed snow-melting salt.

MODE FOR CARRYING OUT THE INVENTION

The present invention relates to a cationic electrodeposition coating composition comprising an amino group-containing epoxy resin (A), a blocked polyisocyanate compound (B), and crosslinked epoxy resin particles (C). The present invention is described in detail below.

[Amino Group-Containing Epoxy Resin (A)]

Examples of the amino group-containing epoxy resin (A) that may be used under the present invention include, for example: (1) adducts of epoxy resins and primary mono- and poly-amines, secondary mono- and poly-amines, or mixtures of primary and secondary polyamines (refer to U.S. Pat. No. 3,984,299, for example); (2) adducts of epoxy resins and ketiminated primary amino group-containing secondary mono- and poly-amines (refer to U.S. Pat. No. 4,017,438, for example); and (3) reactants obtained through etherification of epoxy resins and ketiminated primary amino group-containing hydroxy compounds (refer to Japanese Patent Laid-open No. Sho 59-43013, for example).

The epoxy resin (A-1) used in the manufacture of the aforementioned amino group-containing epoxy resin (A) is a compound having at least one or preferably two or more epoxy groups in one molecule, where one having a molecular weight of at least 300, or in a range of preferably 400 to 4,000, or more preferably 800 to 2,500, in number-average molecular weight, and also having an epoxy equivalent of at least 160, or in a range of preferably 180 to 2,500, or more preferably 400 to 1,500, is suitable. For such epoxy resin, one obtained by reacting a polyphenol compound with an epihalohydrin (such as epichlorohydrin, etc.) may be used, for example.

Polyphenol compounds for use in the formation of the aforementioned epoxy resin include, for example, bis(4-hydroxyphenyl)-2,2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenated bisphenol A], 4,4'-dihydroxybenzophenone, bis(4-hydroxyphenyl)-1,1-ethane, bis(4-hydroxyphenyl)-1, 1-isobutane, bis(4-hydroxy-3-tert-butyl-phenyl)-2,2-propane, bis(2-hydroxynaphtyl)methane, tetra(4-hydroxyphenyl)-1,1,2,2-ethane, 4,4'-dihydroxydiphenylsulfone, phenol novolac, cresol novolac, etc.

Also, among the epoxy resins obtained by reacting a polyphenol compound with an epihalohydrin, epoxy resins derived from bisphenol A and expressed by Formula (1) below are suitable.

Furthermore, higher-molecular-weight and/or polyfunctionalized epoxy resins obtained by reacting an epoxy resin expressed by Formula (1) below with a polyphenol compound may also be used, where, in particular, bisphenol A is suitable for such polyphenol compound.

[Chem. 1]

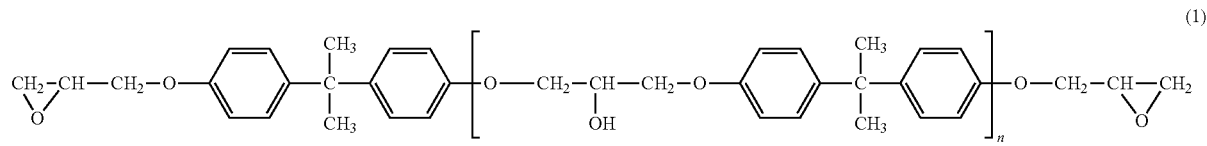

(1)

Here, those expressed by this formula where n=0 to 8, are suitable.

Commercial products of such epoxy resins include, for example, those sold under the product names of jER828EL, jER1002, jER1004, and jER1007, by Mitsubishi Chemical Corporation.

Also, for the aforementioned epoxy resin (A-1), an epoxy resin containing a polyalkylene oxide chain in the resin skeleton may be used. Normally, such epoxy resin can be obtained by, for example, (α) a method whereby an epoxy resin having at least one or preferably two or more epoxy groups is reacted with an alkylene oxide or polyalkylene oxide to introduce a polyalkylene oxide chain, or (β) a method whereby the aforementioned polyphenol compound is reacted with a polyalkylene oxide having at least one or preferably two or more epoxy groups to introduce a polyalkylene oxide chain. Also, an epoxy resin that already contains a polyalkylene oxide chain may be used (refer to Japanese Patent Laid-open No. Hei 8-337750, for example).

The alkylene group in the polyalkylene oxide chain is preferably an alkylene group with 2 to 8 carbon atoms, or more preferably an ethylene group, propylene group, or butylene group, or most preferably a propylene group.

From the viewpoint of improving the stability, finish quality, and anticorrosive property of the coating material, suitably the content of the aforementioned polyalkylene oxide chain as a constituent of the polyalkylene oxide is in a range of normally 1.0 to 15% by mass, or preferably 2.0 to 9.5% by mass, or more preferably 3.0 to 8.0% by mass, relative to the mass in solids content of the amino group-containing epoxy resin.

The primary mono- and poly-amines, secondary mono- and poly-amines or mixtures of primary and secondary polyamines used in the manufacture of the amino group-containing epoxy resin (A) in (1) above include, for example: monomethylamine, dimethylamine, monoethylamine, diethylamine, monoisopropylamine, diisopropylamine, monobutylamine, dibutylamine, and other mono- or di-alkylamines; monoethanolamine, diethanolamine, mono (2-hydroxypropyl)amine, monomethylaminoethanol, and other alkanolamines; ethylenediamine, propylenediamine, butylenediamine, hexamethylenediamine, diethylenetriamine, triethylenetetramine, and other alkylenepolyamines, etc.

The ketiminated primary amino group-containing secondary mono- and poly-amines used in the manufacture of the amino group-containing epoxy resin (A) in (2) above include, for example, ketiminated products generated by reacting a ketone compound with, for example, diethylenetriamine, dipropylenetriamine, etc., among the mixtures of primary and secondary polyamines used in the manufacture of the amine group-containing epoxy resin in (1) above.

The ketiminated primary amino group-containing hydroxy compounds used in the manufacture of the amino group-containing epoxy resin (A) in (3) above include, for example, hydroxyl group-containing ketiminated products obtained by reacting a ketone compound with, for example, a compound having a primary amino group and a hydroxyl group, such as monoethanolamine, mono(2-hydroxypropyl) amine, etc., among the primary mono- and poly-amines, secondary mono- and poly-amines, or mixtures of primary and secondary polyamines used in the manufacture of the amino group-containing epoxy resin (A) in (1) above.

The amine value of such amino group-containing epoxy resin (A) is preferably in a range of 30 to 80 mgKOH/g in solids content of resin, or more preferably in a range of 40 to 70 mgKOH/g in solids content of resin, from the viewpoint of improving the dispersibility in water and anticorrosive property.

Also, the amino group-containing epoxy resin (A) may be modified using a modifying agent, as necessary. Such modifying agent is not limited in any way so long as it is a resin or compound having reactivity with epoxy resins; for example, polyol, polyether polyol, polyester polyol, polyamideamine, polycarboxylic acid, fatty acid, polyisocyanate compound, compound obtained through polyisocyanate compound reaction, ε-caprolactone or other lactone compound, acrylic monomer, compound obtained through polymerization reaction of acrylic monomers, xylene formaldehyde compound, and epoxy compound, may also be used as the modifying agent. Among these modifying agents, any one type may be used alone, or two or more types may be combined.

Among the above, preferably at least one type of saturated and/or unsaturated fatty acid is used as the modifying agent from the viewpoint of deposition property and/or anticorrosive property, in particular. Among the fatty acids that may be used, long-chain fatty acids with 8 to 22 carbon atoms are preferred, including, for example, caprylic acid, capric acid, octanoic acid, nonanoic acid, decanoic acid, lauric acid, myristic acid, pentadecylic acid, palmitic acid, margaric acid, stearic acid, oleic acid, linoleic acid, linolenic acid, etc. Among these, long-chain fatty acids with 10 to 20 carbon atoms are more preferred, while long-chain fatty acids with 13 to 18 carbon atoms are yet more preferred.

The aforementioned addition reaction of the amine compound and modifying agent to the epoxy resin (A-1) is normally performed in an appropriate solvent at a temperature of approx. 80 to 170° C. or preferably approx. 90 to 150° C., for around 1 to 6 hours or preferably around 1 to 5 hours.

The aforementioned solvent may be, for example: toluene, xylene, cyclohexane, n-hexane, or other hydrocarbon-based compound; methyl acetate, ethyl acetate, butyl acetate, or other ester-based compound; acetone, methyl ethyl ketone, methyl isobutyl ketone, methyl amyl ketone, or other ketone-based compound; dimethylformamide, dimethylacetamide, or other amide-based compound; methanol, ethanol, n-propanol, iso-propanol, or other alcohol-based compound; ethylene glycol monobutyl ether, diethylene glycol monoethyl ether, or other ether alcohol-based compound; or a mixture thereof, etc.

The use by percentage of the aforementioned modifying agent is not strictly limited and may be changed as deemed appropriate according to the application of the coating composition, etc.; from the viewpoint of improving the finish quality and anticorrosive property; however, suitably it is in a range of normally 0 to 50% by mass, or preferably 3 to 30% by mass, or more preferably 6 to 20% by mass, relative to the mass in solids content of the amino group-containing epoxy resin.

[Blocked Polyisocyanate Compound (B)]

The blocked polyisocyanate compound (B) is a product of a near-stoichiometric addition reaction between a polyisocyanate compound and an isocyanate blocking agent. For the polyisocyanate compound used in the blocked polyisocyanate compound (B), any of known polyisocyanate compound may be used, including, for example: tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, crude MDI [polymethylene polyphenyl isocyanate], bis(isocyanate methyl)cyclohexane, tetramethylene diisocyanate, hexamethylene diisocyanate, methylene diisocyanate, isophorone diisocyanate, and other aromatic, aliphatic or alicyclic polyisocyanate compounds; cyclized polymers or biurets of these polyisocyanate compounds; or combinations thereof.

In particular, tolylene diisocyanate, xylylene diisocyanate, phenylene diisocyanate, diphenylmethane-2,4'-diisocyanate, diphenylmethane-4,4'-diisocyanate, crude MDI, and other aromatic polyisocyanate compounds (preferably crude MDI, etc.) are more preferred for the sake of anticorrosive property.

On the other hand, the aforementioned isocyanate blocking agent attaches to, and therefore blocks, the isocyanate groups in the polyisocyanate compound, and while the blocked polyisocyanate compound generated by the addition is stable at normal temperature, ideally the blocking agent will dissociate when heated to the coating film baking temperature (normally approx. 100 to 200° C.) so that free isocyanate groups will be regenerated.

Blocking agents that may be used in the blocked polyisocyanate compound (B) include, for example: methyl ethyl ketoxime, cyclohexanone oxime, and other oxime-based compounds; phenol, para-t-butylphenol, cresol, and other phenol-based compounds; n-butanol, 2-ethyl hexanol, phenyl carbinol, methyl phenyl carbinol, ethylene glycol monobutyl ether, diethylene glycol monoethyl ether, ethylene glycol, propylene glycol, and other alcohol-based compounds; ε-caprolactam, γ-butyrolactam, and other lactam-based compounds; dimethyl malonate, diethyl malonate, ethyl acetoacetate, methyl acetoacetate, acetyl acetone, and other active methylene-based compounds, etc. (preferably alcohol-based compounds, etc.).

[Crosslinked Epoxy Resin Particles (C)]

Suitably the crosslinked epoxy resin particles (C) that can be used in the cationic electrodeposition coating composition proposed by the present invention is contained by normally 0.1 to 40 parts by mass, or preferably 1 to 30 parts by mass, or more preferably 5 to 15 parts by mass, relative to the total mass in solids content of the aforementioned resin (A) and compound (B).

(Number-Average Molecular Weight)

From the viewpoint of finish quality as well as anticorrosive property at edges, the number-average molecular weight of the crosslinked epoxy resin particles (C), as measured under the conditions below, is normally under 100,000, or preferably 100 or higher but under 100,000, or more preferably 150 or higher but under 10,000, or yet more preferably 170 or higher but under 8,000, or most preferably 200 or higher but under 5,000.

<Method for Measuring Number-Average Molecular Weight>

The crosslinked epoxy resin particles (C) were diluted with N,N'-dimethylformamide to 1% by mass in solids content concentration and let stand stationary for 24 hours at room temperature. Next, undissolved components (crosslinked components) were filtered out using a GPC Maishori Disk filter (pore size: 0.2 microns), and the number-average molecular weight was measured by the gel permeation chromatography (GPC) mentioned below.

It should be noted that, in gel permeation chromatography (GPC) measurement, generally samples are prepared by filtering out undissolved components (in the present invention, crosslinked components that do not dissolve in solvents) because if present, they may clog the interior of the system and cause it to malfunction.

<Gel Permeation Chromatography (GPC)>

System: "HLC8120GPC" (product name, manufactured by Tosoh Corporation)

Columns: 4 columns including "TSKgel G-4000HXL," "TSKgel G-3000HXL," and "TSKgel G-2000HXL" (product names, all manufactured by Tosoh Corporation)

Mobile phase: N,N'-dimethylformamide

Conditions: Measuring temperature 40° C., flow rate 1 mL/min

Detector: RI

It should be noted that, in this Specification, number-average molecular weights and weight-average molecular weights are each a value obtained by converting the retention time (retention volume) measured using the aforementioned gel permeation chromatography (GPC), to a molecular weight of polystyrene, based on the retention time (retention volume) of standard polystyrene whose molecular weight is known that has been measured under the same conditions.

Since an increase in their molecular weight leads to poor finish quality, the aforementioned crosslinked epoxy resin particles (C) are such that their peak area of molecular weight 100,000 or higher (high molecular fraction), as revealed by the molecular weight measurement data measured by gel permeation chromatography (GPC), accounts for preferably under 40%, or more preferably under 30%, of the total peak area.

It should be noted that, in this Specification, the aforementioned peak area of molecular weight 100,000 or higher may also be referred to as "high molecular fraction."

(Percentage of Undissolved Components (Crosslinked Components))

From the viewpoint of anticorrosive property at edges and in flat areas, as well as finish quality, the percentage of undissolved components (crosslinked components) in the crosslinked epoxy resin particles (C) is preferably 10% by mass or higher, or more preferably 10 to 90% by mass, or yet more preferably 10 to 60% by mass, or most preferably 15 to 45% by mass.

Since a high level of undissolved components leads to poor finish quality, while a low level of undissolved components causes the anticorrosive property at edges to worsen, keeping their percentages within these ranges ensures that sufficient anticorrosive property at edges and finish quality can be achieved at the same time.

It should be noted that the aforementioned percentage of undissolved components (crosslinked components) can be calculated by the method below.

<Method for Measuring Percentage of Undissolved Components (Crosslinked Components)>

The crosslinked epoxy resin particles (C) were diluted with N,N'-dimethylformamide to 1% by mass in solids content concentration and let stand stationary for 24 hours at room temperature. Next, undissolved components (crosslinked components) were filtered out using a GPC Maishori Disk filter (pore size: 0.2 microns), and the residues were dried under the conditions of 130° C.×3 hours and then measured for mass in solids content. The percentage (% by mass) of undissolved components (crosslinked components) can be obtained by the formula below:

Percentage (% by mass) of undissolved components (crosslinked components)=$A/B$×100

A: Mass of filtration residues in solids content
B: Mass of diluted solution of crosslinked epoxy resin particles (C) of 1% by mass in solids content/100
(Volume-average Particle Size)

From the viewpoint of anticorrosive property at edges and in flat areas, as well as finish quality, the volume-average particle size of the crosslinked epoxy resin particles (C) is normally in a range of 30 to 1,000 nm, where it is preferably 100 nm or larger, or more preferably 150 nm or larger, or yet more preferably 200 nm or larger, or most preferably 300 nm or larger. Also, it is preferably 800 nm or smaller, or more preferably 700 nm or smaller, or yet more preferably 600 nm or smaller, or most preferably 500 nm or smaller.

It should be noted that the aforementioned volume-average particle size can be measured using a laser diffraction/scattering measuring device, and that the particle sizes in this Specification were measured using Microtrac UPA250 (product name, manufactured by Nikkiso Co., Ltd., particle size distribution measuring device).

The reason why good anticorrosive property at edges and/or long-term anticorrosive property at edges can be achieved when the crosslinked epoxy resin particles (C) are contained, is considered as follows: while the coating material becomes lower in viscosity at edges at the time of application and/or when heated and cured and therefore flows away from the edges where the coating film tends to become thinner as a result, the presence of a granular component at the edges allows a certain film thickness to be retained. This means that the particle size must be of certain level or larger, but too large a particle size will lead to poor finish quality at edges and/or in flat areas.

Also, from the viewpoint of compatibility and finish quality, preferably the aforementioned particulate component has the same composition as the base resin component of the coating material (epoxy resin in the case of the present invention).

(Absorbance)

The crosslinked epoxy resin particles (C) have an absorbance, as measured with a spectrophotometer under the conditions below, of preferably 0.05 or higher, or more preferably 0.1 or higher, or yet more preferably 0.2 or higher. Also, the absorbance is preferably under 0.7, or more preferably under 0.55, or yet more preferably under 0.5.

If the absorbance of the crosslinked epoxy resin particles (C) measured by the method below is 0.05 or higher, it means that the crosslinked epoxy resin particles (C) are at least in a crosslinked state and that they maintain a certain particle size and concentration (quantity) or larger/higher even in the solvent (their absorbance should become virtually zero once completely dissolved in the solvent). When the quantity and particle size of the crosslinked grains increase, their absorbance also rises, and it was found that this has a high correlation with anticorrosive property at edges.

It should be noted that the measurement method below adjusts the solids content concentration of the crosslinked epoxy resin particles.

<Method for Measuring Absorbance>

The crosslinked epoxy resin particles (C) were diluted with N,N'-dimethylformamide to 1% by mass in solids content concentration and let stand stationary for 24 hours at room temperature. Subsequently, their absorbance at a wavelength of 400 nm was measured with a spectrophotometer "U-1900" (product name, manufactured by Hitachi High-Technologies Corporation).

Also, the diluted solution of crosslinked epoxy resin particles (C) of 1% by mass obtained by the aforementioned method was filtered using a GPC Maishori Disk filter (pore size: 0.2 microns), and the percentage of undissolved components (crosslinked components) was calculated by the formula below:

Percentage (% by mass) of undissolved components=$A/B$×100

A: Mass of filtration residues in solids content
B: Mass of diluted solution of crosslinked epoxy resin particles (C) of 1% by mass in solids content/100

From the viewpoint of anticorrosive property at edges and in flat areas, as well as finish quality, the percentage of undissolved components (crosslinked components) is preferably 10% by mass or higher, or more preferably 10 to 90% by mass, or yet more preferably 10 to 60% by mass, or most preferably 15 to 45% by mass.

Since a high level of undissolved components leads to poor finish quality, while a low level of undissolved components causes anticorrosive property at edges to worsen, keeping their percentage within these ranges ensures that sufficient anticorrosive property at edges and finish quality can be achieved at the same time.

The crosslinked epoxy resin particles (C) that may be used in the cationic electrodeposition coating composition proposed by the present invention are not limited in any way so long as they are particles obtained by crosslinking an epoxy resin with a crosslinking agent. The crosslinking agent may be, for example, a compound having one or more epoxy groups, isocyanate groups, hydroxyl groups, carboxyl groups, amino groups, or other reactive functional groups. Preferably it comprises at least one type of compound selected from the group that consists of epoxy resins, polyisocyanate compounds, polyol compounds, polycarboxylic acid compounds, polyamine compounds, etc.

Examples include, for example, crosslinked epoxy resin particles obtained by: manufacturing an amino group-containing epoxy resin by reacting an epoxy resin and an amine compound; neutralizing the amino group-containing epoxy resin with an acid compound and then dispersing it in an aqueous solvent; and mixing and reacting the obtained dispersion with a polyfunctional epoxy resin and/or polyisocyanate compound.

Preferred under the present invention are those manufactured through steps including: step (I) in which an amino group-containing epoxy resin (C-1) is manufactured by reacting an epoxy resin (C-1-1) and an amine compound (C-1-2); step (II) in which the amino group-containing epoxy resin (C-1) is neutralized with an acid compound and then dispersed in an aqueous solvent; and step (III) in which the obtained dispersion is mixed and reacted with an epoxy resin (C-2) to obtain crosslinked epoxy resin particles (C).

<Step (I)>

For the step in which an amino group-containing epoxy resin (C-1) is manufactured by reacting an epoxy resin (C-1-1) and an amine compound (C-1-2), a manufacturing method similar to the one mentioned above for the amino group-containing epoxy resin (A) may be used.

kokoFor the aforementioned epoxy resin (C-1-1), one similar to the aforementioned epoxy resin (A-1) may be used, where, in particular, an epoxy resin derived from bisphenol A and expressed by Formula (1) above may be suitably used. Furthermore, a higher-molecular-weight and/or polyfunctionalized epoxy resins obtained by reacting an epoxy resin expressed by Formula (1) above with a polyphenol compound may be suitably used, where bisphenol A is preferred for the polyphenol compound.

The number-average molecular weight of the aforementioned epoxy resin (C-1-1) is preferably 400 to 5,000, or more preferably 700 to 3,000.

For the aforementioned amine compound (C-1-2), any of the amine compounds mentioned above in connection with the amino group-containing epoxy resin (A) may be suitably used; in particular, however, preferably it contains a ketiminated amine compound (C-1-2-1) and, for example, preferably it contains a ketiminated primary amino group-containing secondary mono- or poly-amine (C-1-2-2).

The aforementioned ketiminated primary amino group-containing secondary mono- or poly-amine (C-1-2-2) may be, for example, a ketiminated product of an amine compound as expressed by Formula (2) below, where specific examples include diethylenetriamine, dipropylenetriamine, dibutylenetriamine, bis(hexamethylene)triamine, triethylenetetramine, tetraethylenepentamine, pentaethylenehexamine, and other diketiminated products.

[Chem.2]

Formula (2)

(In the formula, R1 and R2 are hydrocarbon groups with 1 to 8 carbon atoms, which may be different or the same. n is an integer of 1 to 5.)

The aforementioned ketiminated amine compound (C-1-2-1) is contained in the amine compound (C-1-2) by a level preferably in a range of 0.1% by mol or higher but under 80% by mol, or more preferably in a range of 1% by mol or higher but under 50% by mol, or yet more preferably in a range of 2% by mol or higher but under 40% by mol, or most preferably in a range of 5% by mol or higher but under 30% by mol.

It should be noted that, in this Specification, the content ratio of the aforementioned ketiminated amine compound (C-1-2-1) may also be referred to as "content ratio of ketimine compound."

The ketiminated, blocked primary amino groups contained in the amine compound (C-1-2-1) is hydrolyzed in the water dispersion step (II) mentioned below, upon which the primary amino groups manifest themselves. Next, in step (III), the primary amino groups react with the epoxy groups in the epoxy resin (C-2) to trigger an increase in molecular weight, and/or crosslinking reaction. This is why the molecular weight, particle size, and/or degree of crosslinkage (percentage of undissolved components) of the crosslinked epoxy resin particles (C) can be kept within optimal ranges when the amine compound (C-1-2-1) is kept within the aforementioned ranges.

<Step (II)>

The amino group-containing epoxy resin (C-1) obtained in step (I) above may be subsequently neutralized with an acid compound and then dispersed in an aqueous solvent to obtain a dispersion.

Here, an "aqueous solvent" refers to a solvent that contains water and other solvent that can be contained as necessary, where the other solvent may be, for example, an ester-based solvent, ketone-based solvent, amide-based solvent, alcohol-based solvent, ether alcohol-based solvent, or mixture thereof, etc.

For the aforementioned acid compound, any known acid compound may be used without limitation, where, in particular, an organic acid is preferred, while formic acid, lactic acid, acetic acid or a mixture thereof is more suitable. The neutralization equivalent is preferably 0.2 to 1.5 equivalent, or more preferably 0.5 to 1.0 equivalent, of the acid compound relative to 1 equivalent of the amino groups.

Also, an emulsifier and other additives may be contained besides the aforementioned acid compound.

The resin (C-1) may be dispersed in the aqueous solvent by adding the aqueous solvent to the neutralized amino group-containing epoxy resin (C-1) under agitation, or by adding the neutralized amino group-containing epoxy resin (C-1) to the aqueous solvent under agitation, or by mixing the aqueous solvent and neutralized amino group-containing epoxy resin (C-1) and then agitating the mixture.

The temperature at which to perform the aforementioned dispersion is preferably under 100° C., or more preferably 40 to 99° C., or yet more preferably 50 to 95° C.

The dispersion has a solids content concentration of resin of preferably 5 to 80% by mass, or more preferably 10 to 50% by mass.

<Step (III)>

The dispersion obtained in step (II) above may be subsequently mixed, and reacted, with an epoxy resin (C-2) or other crosslinking agent to obtain crosslinked epoxy resin particles (C).

For the epoxy resin (C-2), one similar to the aforementioned epoxy resin (A-1), may be used, where, in particular, an epoxy resin derived from bisphenol A and expressed by Formula (1) above may be suitably used. The epoxy equivalent of the aforementioned epoxy resin (C-2) is preferably 180 to 2,000, or more preferably 180 to 500.

In the aforementioned reaction step, the primary amino groups in the amino group-containing epoxy resin (C-1) whose ketiminated blocks have been removed through hydrolysis, react with the epoxy groups in the epoxy resin (C-2), to trigger an increase in molecular weight and/or crosslinking reaction.

The equivalent ratio of the aforementioned primary amino groups and epoxy groups is preferably 0.5 to 2.0 equivalent, or more preferably 0.7 to 1.5 equivalent, of the epoxy groups relative to 1 equivalent of the primary amino groups.

The temperature at which the aforementioned reaction is performed is preferably under 100° C., or more preferably 40 to 99° C., or yet more preferably 50 to 95° C.

Also, the amine value of the crosslinked epoxy_resin particles (C) is preferably in a range of 25 to 200 mgKOH/g, or more preferably in a range of 50 to 180 mgKOH/g. Keeping it within the aforementioned ranges ensures excellent dispersibility of the particles in the aqueous solvent, as well as water resistance of the coating film.

[Cationic Electrodeposition Coating Composition]

The compounding percentages of the amino group-containing epoxy resin (A) and blocked polyisocyanate compound (B) in the cationic electrodeposition coating composition proposed by the present invention are, relative to the total mass of the aforementioned component (A) and component (B) in solids content, in a range of 5 to 95% by mass or preferably 50 to 80% by mass in the case of the component (A), and 5 to 95% by mass or preferably 20 to 50% by mass in the case of the component (B), in the interest of obtaining a coated article offering good coating material stability as well as excellent finish quality and anticorrosive property. Deviations from the aforementioned ranges may lead to loss of any of the aforementioned coating material properties and coating film performances, which is not desired.

Also, regarding the compounding percentage of the component (C), it is normally contained by 0.1 to 40 parts by mass, or preferably it is contained by 1 to 30 parts by mass, or more preferably it is contained by 5 to 15 parts by mass, relative to the total mass of the aforementioned resin (A) and compound (B) in solids content, in the interest of obtaining a coated article excellent in both the anticorrosive property at edges and finish quality.

The method for manufacturing the cationic electrodeposition coating composition proposed by the present invention is not limited in any way, but it may be obtained, for example, by fully mixing the aforementioned resin (A), compound (B), and, if necessary, surfactant, surface conditioner, and various other additives, into a resin preparation, which is then dispersed in water and fully mixed with the crosslinked epoxy resin particles (C), pigment-dispersed paste, water, and organic solvent, neutralizer, etc.

For the aforementioned neutralizer, any known organic acid may be used without limitation, where, in particular, formic acid, lactic acid, or a mixture thereof is suitable.

The aforementioned pigment-dispersed paste comprises a colored pigment, antirust pigment, extender pigment, or other pigment pre-dispersed in fine particles; for example, a pigment-dispersed paste may be prepared by compounding a pigment-dispersing resin, a neutralizer, and a pigment, and then putting the mixture though a dispersion process in a ball mill, sand mill, pebble mill, or other dispersion mixer.

For the aforementioned pigment-dispersing resin, any known pigment-dispersing resin may be used without limitation; for example, a hydroxyl group- and cationic group-containing epoxy resin, acrylic resin, surfactant, or other tertiary amine type epoxy resin, quaternary ammonium salt type epoxy resin, tertiary sulfonium salt type epoxy resin, tertiary amine type acrylic resin, quaternary ammonium salt type acrylic resin, tertiary sulfonium salt type acrylic resin, etc., may be used.

For the aforementioned pigment, any known pigment may be used without limitation; for example, titanium oxide, carbon black, red iron oxide, or other coloring pigment; clay, mica, baryta, calcium carbonate, silica, or other extender pigment; aluminum phosphomolybdate, aluminum tripolyphosphate, zinc oxide (zinc white), or other antirust pigment may be added.

Furthermore, a bismuth compound may be contained for the purpose of corrosion suppression or rust prevention. For the aforementioned bismuth compound, bismuth oxide, bismuth hydroxide, basic bismuth carbonate, bismuth nitrate, bismuth silicate, organic acid bismuth, etc., may be used.

Also, for the purpose of improving the curability of coating film, dibutyltin dibenzoate, dioctyltin oxide, dibutyltin oxide, or other organic tin compound may be used. The curability of coating film can also be improved without containing any such organic tin compound, by applying (in an increased quantity), and/or using a micronized version of, the aforementioned zinc oxide (zinc white) or other antirust pigment and/or bismuth compound. Preferably the compounding quantity of such pigment is in a range of 1 to 100 parts by mass, particularly 10 to 50 parts by mass, per 100 parts by mass representing the total solids content of resin of the resin (A) and compound (B).

[Method for Forming Coating Film]

The present invention provides a method for forming a cationic electrodeposition coating film that includes a step in which a metal target object is immersed in an electrodeposition coating material bath comprising the aforementioned cationic electrodeposition coating composition, and a step in which power is supplied to the bath with the metal target object serving as the cathode.

Target objects of the cationic electrodeposition coating composition proposed by the present invention include automotive bodies, motorcycle components, household appliances, and other devices, etc., and are not limited in any way so long as they are metals.

Metal steel sheets that qualify as target objects include cold-rolled steel sheets, alloyed hot-dip galvanized steel sheets, electrogalvanized steel sheets, two-layer electrogalvanized/iron-plated steel sheets, organic composite-plated steel sheets, as well as Al materials, Mg materials and other metals and sheets thereof whose surface has been cleaned by alkali degreasing, etc., as necessary, and then treated by phosphating, chromating, etc.

The cationic electrodeposition coating composition may be applied on the base material surface of a desired target object by means of cationic electrodeposition coating. In general, the cationic electrodeposition method is performed using a bath comprising the cationic electrodeposition coating composition that has been diluted with deionized water, etc., to a solids content concentration of approx. 5 to 40% by mass or preferably 10 to 25% by mass, with the pH also adjusted to a range of 4.0 to 9.0 or preferably 5.5 to 7.0, where, normally, the bath temperature is adjusted to 15 to 35° C. and power is supplied to the bath under a load voltage condition of 100 to 400 V or preferably 150 to 350 V, with the target object serving as the cathode. Following the electrodeposition coating, normally the target object is fully washed with ultrafiltrate (UF), reverse-osmosis water (RO water), industrial water, purified water, etc., to remove any excess cationic electrodeposition coating material attached to the target object.

The thickness of the electrodeposition coating film is not limited in any way, but it is generally in a range of 5 to 40 μm, or preferably 10 to 30 μm, based on the dried coating film. Also, the coating film is baked and dried by heating the electrodeposition coating film using an electric hot-air dryer, gas hot-air dryer, or other drying equipment at a temperature of 110 to 200° C. or preferably 140 to 180° C. on the surface of the coated object, for a period of 10 to 180 minutes or preferably 20 to 50 minutes. As a result of the aforementioned baking and drying, a cured coating film can be obtained.

EXAMPLES

The present invention is explained in greater detail below using manufacturing examples, examples, and comparative examples; it should be noted, however, that the present invention is not limited to these examples. In each example, "part(s)" refers to part(s) by mass, while "%" refers to % by mass.

[Manufacturing of Amino Group-Containing Epoxy Resin (A)]

Manufacturing Example 1

Into a flask equipped with an agitator, a thermometer, a nitrogen introduction tube, and a reflux condenser, 1,200 parts of jER828EL (product name, manufactured by Japan Epoxy Resin Co., Ltd., epoxy resin, epoxy equivalent 190, number-average molecular weight 350), 500 parts of bisphenol A, and 0.2 parts of dimethylbenzylamine were added and let react at 130° C. to an epoxy equivalent of 850.

Next, 160 parts of diethanolamine and 65 parts of a ketiminated product of diethylenetriamine and methyl isobutyl ketone were added and let react at 120° C. for 4 hours, after which 480 parts of ethylene glycol monobutyl ether were added, to obtain a solution of amino group-containing epoxy resin A-1 of 80% in solids content. Amino group-containing epoxy resin A-1 had an amine value of 59 mgKOH/g and a number-average molecular weight of 2,100.

[Manufacturing of Blocked Polyisocyanate Compound (B)]

Manufacturing Example 2

Into a reaction container, 270 parts of Cosmonate M-200 (product name, manufactured by Mitsui Chemicals, Inc., crude MDI, NCO group content ratio 31.3%) and 127 parts of methyl isobutyl ketone were added and the temperature was raised to 70° C. Into this mixture, 236 parts of ethylene glycol monobutyl ether were dripped over 1 hour, after which the temperature was raised to 100° C., and while this temperature was held, samples were taken periodically until infrared absorption spectrometry confirmed that unreacted isocyanate groups were no longer absorbed, to obtain blocked polyisocyanate compound B-1 of 80% in solids content of resin.

[Manufacturing of Pigment-Dispersing Resin]

Manufacturing Example 3

Into a flask equipped with an agitator, a thermometer, a drip funnel, and a reflux condenser, 1,010 parts of jER828EL, 390 parts of bisphenol A, 240 parts of Placcel 212 (product name, polycaprolactone diol, manufactured by Daicel Chemical Industries, Ltd., weight-average molecular weight approx. 1,250), and 0.2 parts of dimethylbenzylamine were added and let react at 130° C. to an epoxy equivalent of approx. 1,090. Next, 134 parts of dimethylethanolamine and 150 parts of an aqueous solution of lactic acid of 90% in concentration were added and let react at 90° C. until the epoxy groups were eliminated. Next, propylene glycol monomethyl ether was added to adjust the solids content, to obtain a quaternary ammonium salt group-containing pigment-dispersing resin of 60% in solids content.

[Manufacturing of Pigment-Dispersed Paste]

Manufacturing Example 4

8.3 parts (5 parts in solids content) of the quaternary ammonium salt group-containing pigment dispersing resin of 60% in solids content obtained in Manufacturing Example 3, 14.5 parts of titanium oxide, 7 parts of refined clay, 0.3 parts of carbon black, 2 parts of bismuth hydroxide, and 20.3 parts of deionized water were added together and dispersed for 20 hours in a ball mill, to obtain pigment-dispersed paste P-1 of 55% in solids content.

[Manufacturing of Crosslinked Epoxy Resin Particles (C)]

Manufacturing Example 5

Into a reaction container equipped with an agitator, a thermometer, a drip funnel, and a reflux condenser, 527 parts of jER828EL, 160 parts of bisphenol A, and 0.1 parts of dimethylbenzylamine were added and let react to an epoxy equivalent of 490 g/mol by holding the temperature in the reaction container at 160° C. Next, the temperature in the reaction container was cooled to 140° C., 1.7 parts of dimethylbenzylamine were added and let react to an epoxy equivalent of 890 g/mol, after which the temperature in the reaction container was cooled to 100° C. while adding 220 parts of methyl isobutyl ketone. Next, a mixture consisting of 45 parts of N-methylethanolamine and 45 parts of a diketiminated product of diethylenetriamine and methyl isobutyl ketone (content ratio of ketimine compound:22% by mol) was added and let react for 1 hour at 115° C., to obtain an amino group-containing epoxy resin solution.

Of the obtained amino group-containing epoxy resin solution, 204 parts were transferred to a new reaction container, and the temperature in the reaction container was held at 90° C. Next, 16 parts of 88% lactic acid were added to acid-neutralize the solution, after which 664 parts of deionized water were added to dilute and disperse the solution. Next, 16 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-1) of 18% in solids content.

Manufacturing Example 6

Into a reaction container equipped with an agitator, a thermometer, a drip funnel, and a reflux condenser, 478 parts of jER828EL, 238 parts of bisphenol A, and 0.1 parts of dimethylbenzylamine were added and let react to an epoxy equivalent of 1,540 g/mol by holding the temperature in the reaction container at 160° C. Next, the temperature in the reaction container was cooled to 100° C. while adding 233 parts of methyl isobutyl ketone. Next, a mixture consisting of 23 parts of N-methylethanolamine and 28 parts of a diketiminated product of diethylenetriamine and methyl isobutyl ketone (content ratio of ketimine compound:25% by mol) was added and let react for 1 hour at 115° C., to obtain an amino group-containing epoxy resin solution.

Of the obtained amino group-containing epoxy resin solution, 217 parts were transferred to a new reaction container, and the temperature in the reaction container was held at 90° C. Next, 10 parts of 88% lactic acid were added to acid-neutralize the solution, after which 662 parts of deionized water were added to dilute and disperse the solution.

Next, 11 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-2) of 18% in solids content.

Manufacturing Example 7

Into a reaction container equipped with an agitator, a thermometer, a drip funnel, and a reflux condenser, 472 parts of jER828EL, 253 parts of bisphenol A, and 0.1 parts of dimethylbenzylamine were added and let react to an epoxy equivalent of 2,450 g/mol by holding the temperature in the reaction container at 160° C. Next, the temperature in the reaction container was cooled to 100° C. while adding 235 parts of methyl isobutyl ketone. Next, a mixture consisting of 16 parts of N-methylethanolamine and 24 parts of a diketiminated product of diethylenetriamine and methyl isobutyl ketone (content ratio of ketimine compound:30% by mol) was added and let react for 1 hour at 115° C., to obtain an amino group-containing epoxy resin solution.

Of the obtained amino group-containing epoxy resin solution, 220 parts were transferred to a new reaction container, and the temperature in the reaction container was held at 90° C. Next, 7 parts of 88% lactic acid were added to acid-neutralize the solution, after which 662 parts of deionized water were added to dilute and disperse the solution.

Next, 11 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-3) of 18% in solids content.

Manufacturing Example 8

Into a reaction container equipped with an agitator, a thermometer, a drip funnel, and a reflux condenser, 472 parts of jER828EL, 253 parts of bisphenol A, and 0.1 parts of dimethylbenzylamine were added and let react to an epoxy equivalent of 2,450 g/mol by holding the temperature in the reaction container at 160° C. Next, the temperature in the reaction container was cooled to 100° C. while adding 230 parts of methyl isobutyl ketone. Next, a mixture consisting of 13 parts of N-methylethanolamine and 32 parts of a diketiminated product of diethylenetriamine and methyl isobutyl ketone (content ratio of ketimine compound:40% by mol) was added and let react for 1 hour at 115° C., to obtain an amino group-containing epoxy resin solution.

Of the obtained amino group-containing epoxy resin solution, 214 parts were transferred to a new reaction container, and the temperature in the reaction container was held at 90° C. Next, 6 parts of 88% lactic acid were added to acid-neutralize the solution, after which 662 parts of deionized water were added to dilute and disperse the solution.

Next, 18 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-4) of 18% in solids content.

Manufacturing Example 9

Into a reaction container equipped with an agitator, a thermometer, a drip funnel, and a reflux condenser, 477 parts of jER828EL, 237 parts of bisphenol A, and 0.1 parts of dimethylbenzylamine were added and let react to an epoxy equivalent of 1,540 g/mol by holding the temperature in the reaction container at 160° C. Next, the temperature in the reaction container was cooled to 100° C. while adding 223 parts of methyl isobutyl ketone. Next, a mixture consisting of 19 parts of N-methylethanolamine and 44 parts of a diketiminated product of diethylenetriamine and methyl isobutyl ketone (content ratio of ketimine compound:40% by mol) was added and let react for 1 hour at 115° C., to obtain an amino group-containing epoxy resin solution.

Of the obtained amino group-containing epoxy resin solution, 210 parts were transferred to a new reaction container, and the temperature in the reaction container was held at 90° C. Next, 11 parts of 88% lactic acid were added to acid-neutralize the solution, after which 663 parts of deionized water were added to dilute and disperse the solution.

Next, 16 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-5) of 18% in solids content.

Manufacturing Example 10

Into a reaction container equipped with an agitator, a thermometer, a drip funnel, and a reflux condenser, 413 parts of jER828EL, 126 parts of bisphenol A, and 0.1 parts of dimethylbenzylamine were added and let react to an epoxy equivalent of 490 g/mol by holding the temperature in the reaction container at 160° C. Next, the temperature in the reaction container was cooled to 140° C., 1.3 parts of dimethylbenzylamine were added and let react to an epoxy equivalent of 890 g/mol, after which the temperature in the reaction container was cooled to 100° C. while adding 177 parts of methyl isobutyl ketone. Next, a mixture consisting of 44 parts of diethanolamine, 4 parts of N-methylethanolamine, and 35 parts of a diketiminated product of diethylenetriamine and methyl isobutyl ketone (content ratio of ketimine compound:22% by mol) was added and let react for 1 hour at 115° C., to obtain an amino group-containing epoxy resin solution.

Of the obtained amino group-containing epoxy resin solution, 305 parts were transferred to a new reaction container, and the temperature in the reaction container was held at 90° C. Next, 26 parts of 88% lactic acid were added to acid-neutralize the solution, after which 1,146 parts of deionized water were added to dilute and disperse the solution. Next, 24 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-6) of 18% in solids content.

Manufacturing Example 11

Into a reaction container equipped with an agitator, a thermometer, a drip funnel, and a reflux condenser, 527 parts of jER828EL, 160 parts of bisphenol A, and 0.1 parts of dimethylbenzylamine were added and let react to an epoxy equivalent of 490 g/mol by holding the temperature in the reaction container at 160° C. Next, the temperature in the reaction container was cooled to 140° C., 1.7 parts of dimethylbenzylamine were added and let react to an epoxy equivalent of 890 g/mol, after which the temperature in the reaction container was cooled to 100° C. while adding 220 parts of methyl isobutyl ketone. Next, a mixture consisting of 45 parts of N-methylethanolamine and 45 parts of a diketiminated product of diethylenetriamine and methyl isobutyl ketone (content ratio of ketimine compound:22% by mol) was added and let react for 1 hour at 115° C., to obtain an amino group-containing epoxy resin solution.

Of the obtained amino group-containing epoxy resin solution, 221 parts were transferred to a new reaction container, and the temperature in the reaction container was held at 90° C. Next, 9 parts of 88% formic acid were added to acid-neutralize the solution, after which 662 parts of deionized water were added to dilute and disperse the solution. Next, 7.8 parts of a hexamethylene diisocyanate solution whose solids content had been adjusted to 80% with methyl isobutyl ketone were added and let react for 3 hours at 90° C., after which the methyl isobutyl ketone was removed under reduced pressure, and the resulting solution was diluted with deionized water, to obtain a solution of crosslinked epoxy resin particles (C-7) of 18% in solids content.

Manufacturing Example 12

Into a reaction container equipped with an agitator, a thermometer, a drip funnel, and a reflux condenser, 527 parts of jER828EL, 160 parts of bisphenol A, and 0.1 parts of dimethylbenzylamine were added and let react to an epoxy equivalent of 490 g/mol by holding the temperature in the reaction container at 160° C. Next, the temperature in the reaction container was cooled to 140° C., 1.7 parts of dimethylbenzylamine were added and let react to an epoxy equivalent of 890 g/mol, after which the temperature in the reaction container was cooled to 100° C. while adding 220 parts of methyl isobutyl ketone. Next, a mixture consisting of 45 parts of N-methylethanolamine and 45 parts of a diketiminated product of diethylenetriamine and methyl isobutyl ketone (content ratio of ketimine compound:22% by mol) was added and let react for 1 hour at 115° C., to obtain an amino group-containing epoxy resin solution.

Of the obtained amino group-containing epoxy resin solution, 206 parts were transferred to a new reaction container, after which 12 parts of a crosslinking agent comprising 28 parts of hexamethylene diisocyanate blocked with 29 parts of methyl ethyl ketoxime were added, and the temperature in the reaction container was held at 60° C. Next, 16 parts of 88% lactic acid were added to acid-neutralize the solution, after which 667 parts of deionized water were added to disperse the solution. Next, the dispersion was let react for 5 hours at 90° C., after which the methyl isobutyl ketone and methyl ethyl ketoxime were removed under reduced pressure, and the resulting solution was diluted with deionized water, to obtain a solution of crosslinked epoxy resin particles (C-8) of 18% in solids content.

Manufacturing Example 13

Into a reaction container equipped with an agitator, a thermometer, a drip funnel, and a reflux condenser, 470 parts of jER828EL, 252 parts of bisphenol A, and 0.1 parts of dimethylbenzylamine were added and let react to an epoxy equivalent of 2,450 g/mol by holding the temperature in the reaction container at 160° C. Next, the temperature in the reaction container was cooled to 100° C. while adding 226 parts of methyl isobutyl ketone. Next, a mixture consisting of 3 parts of diethylenetriamine, 9 parts of N-methylethanolamine, and 39 parts of a diketiminated product of diethylenetriamine and methyl isobutyl ketone (content ratio of ketimine compound:50% by mol) was added and let react for 1 hour at 115° C., to obtain an amino group-containing epoxy resin solution.

Of the obtained amino group-containing epoxy resin solution, 211 parts were transferred to a new reaction container, and the temperature in the reaction container was held at 90° C. Next, 9 parts of 88% lactic acid were added to acid-neutralize the solution, after which 663 parts of deionized water were added to dilute and disperse the solution.

Next, 18 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-9) of 18% in solids content.

Manufacturing Example 14

Into a reaction container equipped with an agitator, a thermometer, a drip funnel, and a reflux condenser, 1,023 parts of DER-331J (product name, bisphenol A type epoxy resin manufactured by The Dow Chemical Company), 365 parts of bisphenol A-ethylene oxide adduct, 297 parts of bisphenol A, and 88.7 parts of methyl isobutyl ketone were added and heated to 140° C. in a nitrogen atmosphere.

1.4 parts of dimethylbenzylamine were added and the reaction mixture was let stand until its temperature rose to approx. 185° C. due to generated heat, after which it was refluxed to remove water. Next, it was cooled to 160° C. and held for 30 minutes, and then further cooled to 145° C., after which 4.2 parts of dimethylbenzylamine were added.

The reaction was continued at 145° C. until the Gardner-Holdt viscosity (measured by dissolving the mixture in 2-methoxypropanol of 50% in solids content of resin) reached O—P. At this point, the reaction mixture was cooled to 125° C., and a mixture consisting of 131 parts of a diketiminated product of diethylenetriamine and methyl isobutyl ketone (content ratio of ketimine compound:60% by mol) and 85.2 parts of N-methylethanolamine was added.

The temperature of the mixture was let rise to 140° C. due to generated heat and then cooled to 125° C., after which this temperature was held for 1 hour, to obtain an amino group-containing epoxy resin solution.

1 hour later, the aforementioned amino group-containing epoxy resin was dispersed in a solvent consisting of 227.7 parts of 88% lactic acid and 1,293 parts of deionized water. Next, it was thinned down further with deionized water to be diluted and dispersed to a solids content of 31%.

Thereafter, 2,258.1 parts of the aforementioned obtained dispersion and 1,510.8 parts of deionized water were mixed under agitation, after which a mixed solution consisting of 71.7 parts of DER-331J and 17.9 parts of methyl isobutyl ketone was added under agitation. Next, it was heated to 90° C. and held at this temperature for 3 hours.

When the temperature holding period was over, the reaction mixture was diluted with 598.7 parts of deionized water, after which the methyl isobutyl ketone was removed under reduced pressure, and then deionized water was added, to obtain a solution of crosslinked epoxy resin particles (C-10) of 18% in solids content.

Manufacturing Example 15

Into a reaction container equipped with an agitator, a thermometer, a drip funnel, and a reflux condenser, 940 parts of DER-331J, 388 parts of bisphenol A, and 2 parts of dimethylbenzylamine were added and let react to an epoxy equivalent of 800 g/eq by holding the temperature in the reaction container at 140° C., after which the temperature in the reaction container was cooled to 120° C.

Next, a mixture consisting of 258 parts of a diketiminated product of diethylenetriamine and methyl isobutyl ketone (methyl isobutyl ketone solution of 73% in solids content) (content ratio of ketimine compound:50% by mol), 21 parts of N-methylethanolamine, and 45 parts of diethylenetriamine was added and let react for 1 hour at 120° C., to obtain an amino group-containing epoxy resin solution.

Next, following a cooling to 90° C., deionized water and acetic acid were added to acid-neutralize the solution until the neutralization ratio of the amino groups contained in the amino group-containing epoxy resin became 18%, after which deionized water was added to dilute and disperse the solution to a solids content of 20%.

Thereafter, 188 parts of DER-331J were added and let react for 3 hours at 90° C. The methyl isobutyl ketone was removed under reduced pressure, and then deionized water was added, to obtain a solution of crosslinked epoxy resin particles (C-11) of 18% in solids content.

Manufacturing Example 16

Into a reaction container equipped with an agitator, a thermometer, a drip funnel, and a reflux condenser, 527 parts of jER828EL, 160 parts of bisphenol A, and 0.1 parts of dimethylbenzylamine were added and let react to an epoxy equivalent of 490 g/mol by holding the temperature in the reaction container at 160° C. Next, the temperature in the reaction container was cooled to 140° C., 1.7 parts of dimethylbenzylamine were added and let react to an epoxy equivalent of 890 g/mol, after which the temperature in the reaction container was cooled to 100° C. while adding 220 parts of methyl isobutyl ketone. Next, a mixture consisting of 45 parts of N-methylethanolamine and 45 parts of a diketiminated product of diethylenetriamine and methyl isobutyl ketone (content ratio of ketimine compound:22% by mol) was added and let react for 1 hour at 115° C., to obtain an amino group-containing epoxy resin solution.

Of the obtained amino group-containing epoxy resin solution, 204 parts were transferred to a new reaction container, and the temperature in the reaction container was held at 90° C. Next, 16 parts of 88% lactic acid were added to acid-neutralize the solution, after which 664 parts of deionized water were added to dilute and disperse the solution. Next, 16 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-12) of 18% in solids content.

Manufacturing Example 17

Into a reaction container equipped with an agitator, a thermometer, a drip funnel, and a reflux condenser, 412 parts of jER828EL, 125 parts of bisphenol A, and 0.1 parts of dimethylbenzylamine were added and let react to an epoxy equivalent of 490 g/mol by holding the temperature in the reaction container at 160° C. Next, the temperature in the reaction container was cooled to 140° C., 1.3 parts of dimethylbenzylamine were added and let react to an epoxy equivalent of 890 g/mol, after which the temperature in the reaction container was cooled to 100° C. while adding 177 parts of methyl isobutyl ketone. Next, a mixture consisting of 50 parts of diethanolamine and 35 parts of a diketiminated product of diethylenetriamine and methyl isobutyl ketone (content ratio of ketimine compound:22% by mol) was added and let react for 1 hour at 115° C., to obtain an amino group-containing epoxy resin solution.

Of the obtained amino group-containing epoxy resin solution, 664 parts were transferred to a new reaction container, and the temperature in the reaction container was held at 90° C. Next, 50 parts of 88% lactic acid were added to acid-neutralize the solution, after which 2,475 parts of deionized water were added to dilute and disperse the solution. Next, 51 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-13) of 18% in solids content.

Manufacturing Example 18

Into a reaction container equipped with an agitator, a thermometer, a drip funnel, and a reflux condenser, 412 parts of jER828EL, 125 parts of bisphenol A, and 0.1 parts of dimethylbenzylamine were added and let react to an epoxy equivalent of 490 g/mol by holding the temperature in the reaction container at 160° C. Next, the temperature in the reaction container was cooled to 140° C., 1.3 parts of dimethylbenzylamine were added and let react to an epoxy equivalent of 890 g/mol, after which the temperature in the reaction container was cooled to 100° C. while adding 177 parts of methyl isobutyl ketone. Next, a mixture consisting of 50 parts of diethanolamine and 35 parts of a diketiminated product of diethylenetriamine and methyl isobutyl ketone (content ratio of ketimine compound:22% by mol) was added and let react for 1 hour at 115° C., to obtain an amino group-containing epoxy resin solution.

Of the obtained amino group-containing epoxy resin solution, 349 parts were transferred to a new reaction container, and the temperature in the reaction container was held at 90° C. Next, 26 parts of 88% lactic acid were added to acid-neutralize the solution, after which 1,128 parts of deionized water were added to dilute and disperse the solution. Next, 27 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-14) of 18% in solids content.

Manufacturing Example 19

Into a reaction container equipped with an agitator, a thermometer, a drip funnel, and a reflux condenser, 527 parts of jER828EL, 160 parts of bisphenol A, and 0.1 parts of dimethylbenzylamine were added and let react to an epoxy equivalent of 490 g/mol by holding the temperature in the reaction container at 160° C. Next, the temperature in the reaction container was cooled to 140° C., 1.7 parts of dimethylbenzylamine were added and let react to an epoxy equivalent of 890 g/mol, after which the temperature in the reaction container was cooled to 100° C. while adding 221 parts of methyl isobutyl ketone. Next, a mixture consisting of 45 parts of N-methylethanolamine and 45 parts of a diketiminated product of diethylenetriamine and methyl isobutyl ketone (content ratio of ketimine compound:22% by mol) was added and let react for 1 hour at 115° C., to obtain an amino group-containing epoxy resin solution.

Of the obtained amino group-containing epoxy resin solution, 1,062 parts were transferred to a new reaction container, and the temperature in the reaction container was held at 90° C. Next, 82 parts of 88% lactic acid were added to acid-neutralize the solution, after which 3,026 parts of deionized water were added to dilute and disperse the solution. Next, 84 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-15) of 18% in solids content.

Manufacturing Example 20

Into a reaction container equipped with an agitator, a thermometer, a drip funnel, and a reflux condenser, 527 parts of jER828EL, 160 parts of bisphenol A, and 0.1 parts of dimethylbenzylamine were added and let react to an epoxy equivalent of 490 g/mol by holding the temperature in the reaction container at 160° C. Next, the temperature in the reaction container was cooled to 140° C., 1.7 parts of dimethylbenzylamine were added and let react to an epoxy equivalent of 890 g/mol, after which the temperature in the reaction container was cooled to 100° C. while adding 221 parts of methyl isobutyl ketone. Next, a mixture consisting of 45 parts of N-methylethanolamine and 45 parts of a diketiminated product of diethylenetriamine and methyl isobutyl ketone (content ratio of ketimine compound:22% by mol) was added and let react for 1 hour at 115° C., to obtain an amino group-containing epoxy resin solution.

Of the obtained amino group-containing epoxy resin solution, 615 parts were transferred to a new reaction container, and the temperature in the reaction container was held at 90° C. Next, 47 parts of 88% lactic acid were added to acid-neutralize the solution, after which 1,817 parts of deionized water were added to dilute and disperse the solution. Next, 73 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-16) of 18% in solids content.

Manufacturing Example 21

Into a reaction container equipped with an agitator, a thermometer, a drip funnel, and a reflux condenser, 472 parts of jER828EL, 253 parts of bisphenol A, and 0.1 parts of dimethylbenzylamine were added and let react to an epoxy equivalent of 2,450 g/mol by holding the temperature in the reaction container at 160° C. Next, the temperature in the reaction container was cooled to 100° C. while adding 235 parts of methyl isobutyl ketone. Next, a mixture consisting of 16 parts of N-methylethanolamine and 24 parts of a diketiminated product of diethylenetriamine and methyl isobutyl ketone (content ratio of ketimine compound:30% by mol) was added and let react for 1 hour at 115° C., to obtain an amino group-containing epoxy resin solution.

Of the obtained amino group-containing epoxy resin solution, 220 parts were transferred to a new reaction container, and the temperature in the reaction container was held at 90° C. Next, 7 parts of 88% lactic acid were added to acid-neutralize the solution, after which 662 parts of deionized water were added to dilute and disperse the solution.

Next, 11 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-17) of 18% in solids content.

Manufacturing Example 22

Into a reaction container equipped with an agitator, a thermometer, a drip funnel, and a reflux condenser, 472 parts of jER828EL, 253 parts of bisphenol A, and 0.1 parts of dimethylbenzylamine were added and let react to an epoxy equivalent of 2,450 g/mol by holding the temperature in the reaction container at 160° C. Next, the temperature in the reaction container was cooled to 100° C. while adding 230 parts of methyl isobutyl ketone. Next, a mixture consisting of 13 parts of N-methylethanolamine and 32 parts of a diketiminated product of diethylenetriamine and methyl isobutyl ketone (content ratio of ketimine compound:40% by mol) was added and let react for 1 hour at 115° C., to obtain an amino group-containing epoxy resin solution.

Of the obtained amino group-containing epoxy resin solution, 214 parts were transferred to a new reaction container and the temperature in the reaction container was held at 90° C. Next, 6 parts of 88% lactic acid were added to acid-neutralize the solution, after which 662 parts of deionized water were added to dilute and disperse the solution.

Next, 18 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-18) of 18% in solids content.

Manufacturing Example 23

Into a reaction container equipped with an agitator, a thermometer, a drip funnel, and a reflux condenser, 940 parts of DER-331J, 388 parts of bisphenol A, and 2 parts of dimethylbenzylamine were added and let react to an epoxy equivalent of 800 g/eq by holding the temperature in the reaction container at 140° C., after which the temperature in the reaction container was cooled to 120° C.

Next, a mixture consisting of 258 parts of a diketiminated product of diethylenetriamine and methyl isobutyl ketone (methyl isobutyl ketone solution of 73 percent in solids content) (content ratio of ketimine compound:50% by mol), 21 parts of N-methylethanolamine, and 45 parts of diethylenetriamine was added and let react for 1 hour at 120° C., to obtain an amino group-containing epoxy resin solution.

Next, following a cooling to 90° C., deionized water and acetic acid were added to acid-neutralize the solution until the neutralization ratio of the amino groups contained in the amino group-containing epoxy resin became 18%, after which deionized water was added to dilute and disperse the solution to a solids content of 20%.

Thereafter, 188 parts of DER-331J were added and let react for 3 hours at 90° C. The methyl isobutyl ketone was removed under reduced pressure, and then deionized water was added, to obtain a solution of crosslinked epoxy resin particles (C-19) of 20% in solids content.

Manufacturing Example 24

Into a reaction container equipped with an agitator, a thermometer, a drip funnel, and a reflux condenser, 527 parts of jER828EL, 160 parts of bisphenol A, and 0.1 parts of dimethylbenzylamine were added and let react to an epoxy equivalent of 490 g/mol by holding the temperature in the reaction container at 160° C. Next, the temperature in the reaction container was cooled to 140° C., 1.7 parts of dimethylbenzylamine were added and let react to an epoxy equivalent of 890 g/mol, after which the temperature in the reaction container was cooled to 100° C. while adding 221 parts of methyl isobutyl ketone. Next, a mixture consisting of 45 parts of N-methylethanolamine and 45 parts of a diketiminated product of diethylenetriamine and methyl isobutyl ketone (content ratio of ketimine compound:22% by mol) was added and let react for 1 hour at 115° C., to obtain an amino group-containing epoxy resin solution.

Of the obtained amino group-containing epoxy resin solution, 564 parts were transferred to a new reaction container, and the temperature in the reaction container was held at 90° C. Next, 44 parts of 88% lactic acid were added to acid-neutralize the solution, after which 1,630 parts of deionized water were added to dilute and disperse the solution. Next, 54 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-20) of 18% in solids content.

Manufacturing Example 25

Into a reaction container equipped with an agitator, a thermometer, a drip funnel, and a reflux condenser, 413 parts of jER828EL, 126 parts of bisphenol A, and 0.1 parts of dimethylbenzylamine were added and let react to an epoxy equivalent of 490 g/mol by holding the temperature in the reaction container at 160° C. Next, the temperature in the reaction container was cooled to 140° C., 1.3 parts of dimethylbenzylamine were added and let react to an epoxy equivalent of 890 g/mol, after which the temperature in the reaction container was cooled to 100° C. while adding 177 parts of methyl isobutyl ketone. Next, a mixture consisting of 44 parts of diethanolamine, 4 parts of N-methylethanolamine, and 35 parts of a diketiminated product of diethylenetriamine and methyl isobutyl ketone (content ratio of ketimine compound:22% by mol) was added and let react for 1 hour at 115° C., to obtain an amino group-containing epoxy resin solution.

Of the obtained amino group-containing epoxy resin solution, 305 parts were transferred to a new reaction container, and the temperature in the reaction container was held at 90° C. Next, 26 parts of 88% lactic acid were added to acid-neutralize the solution, after which 1,146 parts of deionized water were added to dilute and disperse the solution. Next, 24 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-21) of 18% in solids content.

Manufacturing Example 26

Into a reaction container equipped with an agitator, a thermometer, a drip funnel, and a reflux condenser, 527 parts of jER828EL, 160 parts of bisphenol A, and 0.1 parts of dimethylbenzylamine were added and let react to an epoxy equivalent of 490 g/mol by holding the temperature in the reaction container at 160° C. Next, the temperature in the reaction container was cooled to 140° C., 1.7 parts of dimethylbenzylamine were added and let react to an epoxy equivalent of 890 g/mol, after which the temperature in the reaction container was cooled to 100° C. while adding 220 parts of methyl isobutyl ketone. Next, a mixture consisting of 45 parts of N-methylethanolamine and 45 parts of a diketiminated product of diethylenetriamine and methyl isobutyl ketone (content ratio of ketimine compound:22% by mol) was added and let react for 1 hour at 115° C., to obtain an amino group-containing epoxy resin solution.

Of the obtained amino group-containing epoxy resin solution, 221 parts were transferred to a new reaction container, and the temperature in the reaction container was held at 90° C. Next, 9 parts of 88% formic acid were added to acid-neutralize the solution, after which 662 parts of deionized water were added to dilute and disperse the solution. Next, 7.8 parts of a hexamethylene diisocyanate solution whose solids content had been adjusted to 80% with methyl isobutyl ketone were added and let react for 3 hours at 90° C., after which the methyl isobutyl ketone was removed under reduced pressure, and the resulting solution was diluted with deionized water, to obtain a solution of crosslinked epoxy resin particles (C-22) of 18% in solids content.

Manufacturing Example 27

Into a reaction container equipped with an agitator, a thermometer, a drip funnel, and a reflux condenser, 527 parts of jER828EL, 160 parts of bisphenol A, and 0.1 parts of dimethylbenzylamine were added and let react to an epoxy equivalent of 490 g/mol by holding the temperature in the reaction container at 160° C. Next, the temperature in the reaction container was cooled to 140° C., 1.7 parts of dimethylbenzylamine were added and let react to an epoxy equivalent of 890 g/mol, after which the temperature in the reaction container was cooled to 100° C. while adding 220 parts of methyl isobutyl ketone. Next, a mixture consisting of 45 parts of N-methylethanolamine and 45 parts of a diketiminated product of diethylenetriamine and methyl isobutyl ketone (content ratio of ketimine compound:22% by mol) was added and let react for 1 hour at 115° C., to obtain an amino group-containing epoxy resin solution.

Of the obtained amino group-containing epoxy resin solution, 206 parts were transferred to a new reaction container, after which 12 parts of a crosslinking agent comprising 28 parts of hexamethylene diisocyanate blocked with 29 parts of methyl ethyl ketoxime were added, and the temperature in the reaction container was held at 60° C. Next, 16 parts of 88% lactic acid were added to acid-neutralize the solution, after which 667 parts of deionized water were added to disperse the solution. Next, the dispersion was let react for 5 hours at 90° C., after which the methyl isobutyl ketone and methyl ethyl ketoxime were removed under reduced pressure, and the resulting solution was diluted with deionized water, to obtain a solution of crosslinked epoxy resin particles (C-23) of 18% in solids content.

Manufacturing Example 28

Into a reaction container equipped with an agitator, a thermometer, a drip funnel, and a reflux condenser, 1,610 parts of jER828EL, 864 parts of bisphenol A, and 0.5 parts of dimethylbenzylamine were added and let react to an epoxy equivalent of 2,450 g/mol by holding the temperature in the reaction container at 160° C. Next, the temperature in the reaction container was cooled to 100° C. while adding 848 parts of methyl isobutyl ketone. Next, a mixture consisting of 75 parts of N-methylethanolamine and 2.7 parts of a diketiminated product of diethylenetriamine and methyl isobutyl ketone (content ratio of ketimine compound:1% by mol) was added and let react for 1 hour at 115° C., to obtain an amino group-containing epoxy resin solution.

Of the obtained amino group-containing epoxy resin solution, 740 parts were transferred to a new reaction container, and the temperature in the reaction container was held at 90° C. Next, 23 parts of 88% lactic acid were added to acid-neutralize the solution, after which 2,116 parts of deionized water were added to dilute and disperse the solution.

Next, 1 part of a jER828EL solution whose solids content had been adjusted to 80% with propylene glycol monomethyl ether was added and let react for 3 hours at 90° C., after which the methyl isobutyl ketone was removed under reduced pressure, and the resulting solution was diluted with deionized water, to obtain a solution of crosslinked epoxy resin particles (C-24) of 18% in solids content.

Manufacturing Example 29

Into a reaction container equipped with an agitator, a thermometer, a drip funnel, and a reflux condenser, 1,089 parts of jER828EL, 584 parts of bisphenol A, and 0.3 parts of dimethylbenzylamine were added and let react to an epoxy equivalent of 2,450 g/mol by holding the temperature in the reaction container at 160° C. Next, the temperature in the reaction container was cooled to 100° C. while adding 573 parts of methyl isobutyl ketone. Next, a mixture consisting of 50 parts of N-methylethanolamine and 2.7 parts of a diketiminated product of diethylenetriamine and methyl isobutyl ketone (content ratio of ketimine compound:1.5% by mol) was added and let react for 1 hour at 115° C., to obtain an amino group-containing epoxy resin solution.

Of the obtained amino group-containing epoxy resin solution, 277 parts were transferred to a new reaction container, and the temperature in the reaction container was held at 90° C. Next, 8.6 parts of 88% lactic acid were added to acid-neutralize the solution, after which 794 parts of deionized water were added to dilute and disperse the solution.

Next, 0.6 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-25) of 18% in solids content.

Manufacturing Example 30

Into a reaction container equipped with an agitator, a thermometer, a drip funnel, and a reflux condenser, 1,023 parts of DER-331J, 365 parts of bisphenol A-ethylene oxide adduct, 297 parts of bisphenol A, and 88.7 parts of methyl isobutyl ketone were added and heated to 140° C. in a nitrogen atmosphere.

1.4 parts of dimethylbenzylamine were added and the reaction mixture was let stand until its temperature rose to approx. 185° C. due to generated heat, after which it was refluxed to remove water. Next, it was cooled to 160° C. and held for 30 minutes, and then further cooled to 145° C., after which 4.2 parts of dimethylbenzylamine were added.

The reaction was continued at 145° C. until the Gardner-Holdt viscosity (measured by dissolving the mixture in 2-methoxypropnaol of 50% in solids content of resin) reached O—P. At this point, the reaction mixture was cooled to 125° C., and a mixture consisting of 131 parts of a diketiminated product of diethylenetriamine and methyl isobutyl ketone (content ratio of ketimine compound:60% by mol) and 85.2 parts of N-methylethanolamine was added.

The temperature of the mixture was let rise to 140° C. due to generated heat and then cooled to 125° C., after which this temperature was held for 1 hour, to obtain an amino group-containing epoxy resin solution.

1 hour later, the aforementioned amino group-containing epoxy resin was dispersed in a solvent consisting of 227.7 parts of 88% lactic acid and 1,293 parts of deionized water. Next, it was thinned down further with deionized water to be diluted and dispersed to a solids content of 31%.

Thereafter, 2,258.1 parts of the aforementioned obtained dispersion and 1,510.8 parts of deionized water were mixed under agitation, after which a mixed solution consisting of 71.7 parts of DER-331J and 17.9 parts of methyl isobutyl ketone was added under agitation. Next, it was heated to 90° C. and held at this temperature for 3 hours.

When the temperature holding period was over, the reaction mixture was diluted with 598.7 parts of deionized water, after which the methyl isobutyl ketone was removed under reduced pressure, and then deionized water was added, to obtain a solution of crosslinked epoxy resin particles (C-26) of 18% in solids content.

Manufacturing Example 31

Into a reaction container equipped with an agitator, a thermometer, a drip funnel, and a reflux condenser, 474 parts of jER828EL, 254 parts of bisphenol A, and 0.1 parts of dimethylbenzylamine were added and let react to an epoxy equivalent of 2,450 g/mol by holding the temperature in the reaction container at 160° C. Next, the temperature in the reaction container was cooled to 100° C. while adding 250 parts of methyl isobutyl ketone. Next, a mixture consisting of 22 parts of N-methylethanolamine and 0.4 parts of a diketiminated product of diethylenetriamine and methyl isobutyl ketone (content ratio of ketimine compound:0.5% by mol) was added and let react for 1 hour at 115° C., to obtain an amino group-containing epoxy resin solution.

Of the obtained amino group-containing epoxy resin solution, 509 parts were transferred to a new reaction container, and the temperature in the reaction container was held at 90° C. Next, 16 parts of 88% lactic acid were added to acid-neutralize the solution, after which 1,455 parts of deionized water were added to dilute and disperse the solution.

Next, 0.4 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-27) of 18% in solids content.

Manufacturing Example 32

Into a reaction container equipped with an agitator, a thermometer, a drip funnel, and a reflux condenser, 470 parts of jER828EL, 252 parts of bisphenol A, and 0.1 parts of dimethylbenzylamine were added and let react to an epoxy equivalent of 2,450 g/mol by holding the temperature in the reaction container at 160° C. Next, the temperature in the reaction container was cooled to 100° C. while adding 226 parts of methyl isobutyl ketone. Next, a mixture consisting of 3 parts of diethylenetriamine, 9 parts of N-methylethanolamine, and 39 parts of a diketiminated product of diethylenetriamine and methyl isobutyl ketone (content ratio of ketimine compound:50% by mol) was added and let react for 1 hour at 115° C., to obtain an amino group-containing epoxy resin solution.

Of the obtained amino group-containing epoxy resin solution, 290 parts were transferred to a new reaction container, and the temperature in the reaction container was held at 90° C. Next, 12 parts of 88% lactic acid were added to acid-neutralize the solution, after which 928 parts of deionized water were added to dilute and disperse the solution.

Next, 30 parts of a jER828EL solution whose solids content had been adjusted to 80% with propylene glycol monomethyl ether were added and let react for 3 hours at 90° C., after which the methyl isobutyl ketone was removed under reduced pressure, and the resulting solution was diluted with deionized water, to obtain a solution of crosslinked epoxy resin particles (C-28) of 18% in solids content.

The number-average molecular weights, high molecular fractions, percentages of undissolved components, and volume-average particle sizes of/in the crosslinked epoxy resin particles obtained in Manufacturing Examples 5 to 15 above are shown in Table 1 below.

TABLE 1

| Manufacturing Examples | 5 | 6 | 7 | 8 | 9 | 10 | 11 | 12 | 13 | 14 | 15 |
|---|---|---|---|---|---|---|---|---|---|---|---|
| Crosslinked epoxy resin particles | C-1 | C-2 | C-3 | C-4 | C-5 | C-6 | C-7 | C-8 | C-9 | C-10 | C-11 |
| Number-average molecular weight (Note 1) | 1,000 | 3,000 | 8,000 | 30,000 | 4,000 | 1,000 | 1,000 | 1,500 | 120,000 | 1,000,000 | 1,000,000 |
| High molecular fraction (%) (Note 2) | 10 | 12 | 20 | 30 | 15 | 10 | 10 | 12 | 40 | 40 | 85 |
| Percentage of undissolved components (% by mass) (Note 3) | 20 | 20 | 35 | 50 | 27 | 15 | 20 | 25 | 60 | 60 | 70 |
| Volume-average particle size (nm) (Note 4) | 220 | 350 | 350 | 470 | 220 | 45 | 220 | 200 | 180 | 75 | 310 |

(Note 1)

Number-average molecular weight: The crosslinked epoxy resin particles were diluted with N,N'-dimethylformamide to a concentration of 1% by mass in solids content and let stand stationary for 24 hours at room temperature. Next, undissolved components (crosslinked components) were filtered out using a GPC Maishori Disk filter (pore size: 0.2 microns), and the number-average molecular weight was measured using a gel permeation chromatography (GPC) ("HLC8120GPC" (product name, manufactured by Tosoh Corporation)).

(Note 2)

High molecular fraction (%): Indicates, in the aforementioned molecular weight measurement data, the percentage (%) of the peak area of molecular weight 100,000 or higher to the total peak area.

(Note 3)

Percentage of undissolved components (% by mass): The crosslinked epoxy resin particles were diluted with N,N'-dimethylformamide to 1% by mass in solids content concentration and let stand stationary for 24 hours at room temperature. Subsequently, it was filtered using a GPC Maishori Disk filter (pore size: 0.2 microns), and the percentage of undissolved components (crosslinked components) was calculated by the formula below: Percentage (% by mass) of undissolved components = A/B × 100 (A: Mass of filtration residues in solids content, B: Mass of diluted solution of crosslinked epoxy resin particles (C) of 1% by mass in solids content/100)

(Note 4)

Volume-average particle size (nm): The crosslinked epoxy resin particles were measured using Microtrac UPA250 (product name, manufactured by Nikkiso Co., Ltd., particle size distribution measuring device).

The volume-average particle sizes, absorbances, and percentages of undissolved components of/in the crosslinked epoxy resin particles obtained in Manufacturing Examples 16 to 32 above are shown in Table 2 below. It should be noted that the particles (C-27) in Manufacturing Example 31 had dissolved in the solvent and thus particle size could not be measured.

TABLE 2

| Manufacturing Examples | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|
| Crosslinked epoxy resin particles | C-12 | C-13 | C-14 | C-15 | C-16 | C-17 | C-18 | C-19 | C-20 | C-21 | C-22 | C-23 | C-24 | C-25 | C-26 | C-27 | C-28 |
| Volume-average particle size (nm) (Note 5) | 220 | 85 | 150 | 330 | 700 | 350 | 470 | 300 | 470 | 45 | 220 | 200 | 30 | 70 | 75 | Dissolved | 1100 |
| Absorbance (Note 6) | 0.15 | 0.05 | 0.1 | 0.2 | 0.5 | 0.2 | 0.35 | 0.2 | 0.35 | 0.02 | 0.15 | 0.15 | 0.02 | 0.05 | 0.05 | 0 | 0.8 |
| Percentage of undissolved components (% by mass) (Note 7) | 0.2 | 0.2 | 0.2 | 0.2 | 0.2 | 0.35 | 0.5 | 0.7 | 0.2 | 0.15 | 0.2 | 0.25 | 0.02 | 0.05 | 60 | 0 | 70 |

(Note 5)
Volume-average particle size (nm): The crosslinked epoxy resin particles were diluted with N,N'-dimethylformamide and measured using Microtrac UPA250 (product name, manufactured by Nikkiso Co., Ltd., particle size distribution measuring device).
(Note 6)
Absorbance: The crosslinked epoxy resin particles were diluted with N,N'-dimethylformamide to 1% by mass in solids content concentration and let stand stationary for 24 hours at room temperature. Subsequently, their absorbance at a wavelength of 400 nm was measured with a spectrophotometer "U-1900" (product name, manufactured by Hitachi High-Technologies Corporation).
(Note 7)
Percentage of undissolved components (% by mass): The crosslinked epoxy resin particles were diluted with N,N'-dimethylformamide to 1% by mass in solids content concentration and let stand stationary for 24 hours at room temperature. Subsequently, the solution was filtered using a GPC Maishori Disk filter (pore size: 0.2 microns) and the percentage of undissolved components (crosslinked components) was calculated by the formula below: Percentage (% by mass) of undissolved components = A/B × 100 (A: Mass of filtration residues in solids content, B: Mass of diluted solution of crosslinked epoxy resin particles (C) of 1% by mass in solids content/100)

[Manufacturing of Cationic Electrodeposition Coating Composition]

Example 1

87.5 parts (70 parts in solids content) of the amino group-containing epoxy resin (A-1) obtained in Manufacturing Example 1 and 37.5 parts (30 parts in solids content) of the blocked polyisocyanate compound (B-1) obtained in Manufacturing Example 2 were mixed, into which 13 parts of 10% acetic acid were compounded further and the mixture was agitated homogeneously, after which deionized water was dripped over approx. 15 minutes under strong agitation, to obtain an emulsion of 34% in solids content.

Next, 294 parts (100 parts in solids content) of the aforementioned emulsion, 52.4 parts of pigment-dispersed paste P-1 obtained in Manufacturing Example 4, 33.3 parts (6 parts in solids content) of the solution of crosslinked epoxy resin particles (C-1) obtained in Manufacturing Example 5, and deionized water, were added to manufacture a cationic electrodeposition coating composition (X-1) of 20% in solids content.

Examples 2 to 17, Comparative Examples 1, 2

Cationic electrodeposition coating compositions (X-2) to (X-19) were manufactured in the exact same manner as in Example 1, except that the formulations in Table 3 below were followed.

Additionally, the results of the evaluation tests (anticorrosive property at edges (96 h), anticorrosive property in flat areas (film thickness 15 μm), finish quality (film thickness 15 μm) and finish quality (film thickness 22 μm)) described below are also indicated in the table. The cationic electrodeposition coating compositions proposed by the present invention must be found acceptable by the evaluation tests in the evaluation of all of anticorrosive property at edges (96 h), anticorrosive property in flat areas, and finish quality (film thickness 22 μm) (the values of finish quality (film thickness 15 μm) are provided for reference). It should be noted that all compounding quantities in the table are values in solids content.

TABLE 3

| | Examples | | | | | | | | | | | | | | | | | Comparative Examples | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 1 | 2 |
| Cationic electrodeposition coating material | X-1 | X-2 | X-3 | X-4 | X-5 | X-6 | X-7 | X-8 | X-9 | X-10 | X-11 | X-12 | X-13 | X-14 | X-15 | X-16 | X-17 | X-18 | X-19 |
| Amino group-containing epoxy resin (A-1) | 70 | 70 | 70 | 70 | 70 | 70 | 70 | 70 | 70 | 70 | 82 | 70 | 70 | 70 | 70 | 70 | 70 | 70 | 70 |

TABLE 3-continued

|  |  | Examples ||||||||||||||||| Comparative Examples ||
| --- | --- | --- | --- | --- | --- | --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 11 | 12 | 13 | 14 | 15 | 16 | 17 | 1 | 2 |
| Blocked polyisocyanate compound (B-1) |  | 30 | 30 | 30 | 30 | 30 | 30 | 30 | 30 | 30 | 30 | 18 | 30 | 30 | 30 | 30 | 30 | 30 | 30 | 30 |
| Crosslinked epoxy resin particles | Type | C-1 | C-2 | C-3 | C-4 | C-5 | C-1 | C-1 | C-1 | C-1 | C-1 | C-1 | C-6 | C-7 | C-8 | C-9 | C-10 | C-11 | None | C-1 |
|  | Content | 6 | 6 | 6 | 6 | 6 | 2 | 0.5 | 17 | 25 | 35 | 6 | 12 | 6 | 6 | 6 | 6 | 6 | 0 | 50 |
| Evaluation tests | Anticorrosive property at edges (96 h) | A | A | A | A | A | B | C | A | A | A | D | D | A | A | B | C | A | E | A |
|  | Anticorrosive property in flat areas | A | A | A | A | A | A | A | A | A | A | C | A | A | A | A | A | A | A | A |
|  | Finish quality (film thickness 15 μm) | A | A | C | D | C | A | A | B | C | D | A | D | A | B | D | D | E | A | E |
|  | Finish quality (film thickness 22 μm) | A | A | B | C | B | A | A | A | B | C | A | D | A | A | D | D | D | A | E |

<Anticorrosive Property at Edges (96 h)>

A cutting blade (blade angle 20 degrees, length 10 cm, zinc phosphate-treated) was electrodeposition-coated at a bath temperature of 28° C. by adjusting the energization time to achieve a film thickness of 15 μm on the general surfaces, to prepare a test sheet.

Next, a 96-hour saltwater spray resistance test was performed on this test sheet according to JIS Z-2371, and the edges were evaluated according to the criteria below.

Among the grades, A to D indicate acceptance, while E indicates rejection.

A: Rust did not generate.
B: Rust generated at no more than 10 locations per 10 cm.
C: Rust generated at 11 to 25 locations per 10 cm.
D: Rust generated at 26 to 40 locations per 10 cm.
E: Rust generated at 41 or more locations per 10 cm.

<Preparation of Test Sheets>

A target object, being a cold-rolled steel sheet (150 mm (length)×70 mm (width)×0.8 mm (thickness)) that had been chemical conversion-treated (product name PALBOND #3020, manufactured by Nihon Parkerizing Co., Ltd., phosphate zinc treatment agent), was electrodeposition-coated to a dry film thickness of 15 μm using each of the cationic electrodeposition coating materials obtained in the Examples and Comparative Examples, and then baked and dried for 20 minutes at 170° C., to obtain a test sheet (film thickness 15 μm).

Also, a target object, being a cold-rolled steel sheet (150 mm (length)×70 mm (width)×0.8 mm (thickness)) that had been chemical conversion-treated (product name PALBOND #3020, manufactured by Nihon Parkerizing Co., Ltd., phosphate zinc treatment agent), was electrodeposition-coated to a dry film thickness of 22 μm using each of the cationic electrodeposition coating materials obtained in the Examples and Comparative Examples, and then baked and dried for 20 minutes at 170° C., to obtain a test sheet (film thickness 22 μm).

<Anticorrosive Property in Flat Areas (Film Thickness 15 μm)>

The test sheet (film thickness 15 μm) was cross-cut through the coating film with a cutting knife until the base material was reached, 35° C. salt-spray-tested for 840 hours according to JIS Z-2371, and evaluated according to the criteria below based on the width of any rust or bulge on one side of the cuts.

Among the grades, A to C indicate acceptance, while D indicates rejection.

A: The maximum width of rust or bulge is no more than 2.0 mm on one side of the cuts.
B: The maximum width of rust or bulge is over 2.0 mm but no more than 3.0 mm on one side of the cuts.
C: The maximum width of rust or bulge is over 3.0 mm but no more than 3.5 mm on one side of the cuts.
D: The maximum width of rust or bulge is over 3.5 mm on one side of the cuts.

<Finish Quality (Film Thickness 15 μm)>

The coated surface of the obtained test sheet (film thickness 15 μm) was measured for surface roughness value (Ra) using Surftest 301 (product name, manufactured by Mitutoyo Corporation, surface roughness tester) with a cutoff of 0.8 mm, and the result was evaluated according to the criteria below.

The grades are as follows (A is the best):

A: Surface roughness value (Ra) is under 0.2.
B: Surface roughness value (Ra) is 0.2 or greater but under 0.24.
C: Surface roughness value (Ra) is 0.24 or greater but under 0.28.
D: Surface roughness value (Ra) is 0.28 or greater but under 0.32.
E: Surface roughness value (Ra) is 0.32 or greater.

<Finish Quality (Film Thickness 22 μm)>

The coated surface of the obtained test sheet (film thickness 22 μm) was measured for surface roughness value (Ra) using Surftest 301 (product name, manufactured by Mitutoyo Corporation, surface roughness tester) with a cutoff of 0.8 mm, and the result was evaluated according to the criteria below.

Among the grades, A to D indicate acceptance, while E indicates rejection.

A: Surface roughness value (Ra) is under 0.2.

B: Surface roughness value (Ra) is 0.2 or greater but under 0.24.

C: Surface roughness value (Ra) is 0.24 or greater but under 0.28.

D: Surface roughness value (Ra) is 0.28 or greater but under 0.32.

E: Surface roughness value (Ra) is 0.32 or greater.

Examples 18 to 38, Comparative Examples 3 to 6

Cationic electrodeposition coating compositions (X-20) to (X-44) were manufactured in the exact same manner as in Example 1, except that the formulations in Table 4 below were followed.

Additionally, the results of the evaluation tests (anticorrosive property at edges (96 h), anticorrosive property at edges (192 h), anticorrosive property in flat areas (film thickness 22 µm), finish quality (film thickness 15 µm), and finish quality (film thickness 22 µm)) described below are also indicated in the table. The cationic electrodeposition coating compositions proposed by the present invention must be found acceptable by the evaluation tests in the evaluation of all of anticorrosive property at edges (96 h), anticorrosive property in flat areas, and finish quality (film thickness 22 µm) (the values of anticorrosive property at edges (192 h), and finish quality (film thickness 15 µm) are provided for reference). It should be noted that all compounding quantities in the table are values in solids content.

TABLE 4

| | | Examples | | | | | | | | | | | | | | | | | | | | | | Comparative Examples | | |
|---|---|---|---|---|---|---|---|---|---|---|---|---|---|---|---|---|---|---|---|---|---|---|---|---|---|---|
| | | 18 | 19 | 20 | 21 | 22 | 23 | 24 | 25 | 26 | 27 | 28 | 29 | 30 | 31 | 32 | 33 | 34 | 35 | 36 | 37 | 38 | 3 | 4 | 5 | 6 |
| Cationic electrodeposition coating material | | X-20 | X-21 | X-22 | X-23 | X-24 | X-25 | X-26 | X-27 | X-28 | X-29 | X-30 | X-31 | X-32 | X-33 | X-34 | X-35 | X-36 | X-37 | X-38 | X-39 | X-40 | X-41 | X-42 | X-43 | X-44 |
| Amino group-containing epoxy resin (A-1) | | 70 | 70 | 70 | 70 | 70 | 70 | 70 | 70 | 70 | 70 | 70 | 70 | 70 | 70 | 82 | 70 | 70 | 70 | 70 | 70 | 70 | 70 | 70 | 70 | 70 |
| Blocked polyisocyanate compound (B-1) | | 30 | 30 | 30 | 30 | 30 | 30 | 30 | 30 | 30 | 30 | 30 | 30 | 30 | 30 | 18 | 30 | 30 | 30 | 30 | 30 | 30 | 30 | 30 | 30 | 30 |
| Cross-linked epoxy resin particles | Type | C-12 | C-13 | C-14 | C-15 | C-16 | C-17 | C-18 | C-19 | C-20 | C-12 | C-12 | C-12 | C-12 | C-12 | C-12 | C-12 | C-21 | C-22 | C-23 | C-24 | C-25 | C-26 | None | C-12 | C-27 | C-28 |
| | Content | 6 | 6 | 6 | 6 | 6 | 6 | 6 | 6 | 6 | 2 | 0.5 | 17 | 25 | 35 | 6 | 12 | 6 | 6 | 6 | 6 | 6 | 0 | 50 | 6 | 6 |
| Evaluation tests | Anticorrosive property at edges (96 h) | A | C | B | A | A | A | A | A | A | B | C | A | A | A | D | D | A | A | D | C | C | E | A | E | A |
| | Anticorrosive property at edges (192 h) | B | D | C | A | A | B | B | B | A | C | D | A | A | A | D | D | B | B | E | E | D | E | A | E | A |
| | Anticorrosive property in flat areas | A | A | A | A | A | A | A | A | A | A | A | A | A | C | A | A | A | A | A | A | A | A | A | A | A |
| | Finish quality (film thickness 15 µm) | A | A | A | A | D | C | D | E | B | A | A | B | C | D | A | D | A | B | D | D | D | A | E | C | E |
| | Finish quality (film thickness 22 µm) | A | A | A | A | C | B | C | D | A | A | A | A | B | C | A | D | A | D | D | D | A | A | E | C | E |

<Anticorrosive Property at Edges (96 h)>

A cutting blade (blade angle 20 degrees, length 10 cm, zinc phosphate-treated) was electrodeposition-coated at a bath temperature of 28° C. by adjusting the energization time to achieve a film thickness of 15 μm on the general surfaces, to prepare a test sheet.

Next, a 96-hour saltwater spray resistance test was performed on this test sheet according to JIS Z-2371, and the edges were evaluated according to the criteria below.

Among the grades, A to D indicate acceptance, while E indicates rejection.

A: Rust did not generate.
B: Rust generated at no more than 10 locations per 10 cm.
C: Rust generated at 11 to 25 locations per 10 cm.
D: Rust generated at 26 to 40 locations per 10 cm.
E: Rust generated at 41 or more locations per 10 cm.

<Anticorrosive Property at Edges (192 h)>

A cutting blade (blade angle 20 degrees, length 10 cm, zinc phosphate-treated) was electrodeposition-coated at a bath temperature of 28° C. by adjusting the energization time to achieve a film thickness of 15 μm on the general surfaces, to prepare a test sheet.

Next, 192-hour saltwater spray resistance test was performed on this test sheet according to JIS Z-2371, and the edges were evaluated according to the criteria below.

The grades are as follows (A is the best):
A: Rust did not generate.
B: Rust generated at no more than 10 locations per 10 cm.
C: Rust generated at 11 to 25 locations per 10 cm.
D: Rust generated at 26 to 40 locations per 10 cm.
E: Rust generated at 41 or more locations per 10 cm.

<Preparation of Test Sheets>

A target object, being a cold-rolled steel sheet (150 mm (length)×70 mm (width)×0.8 mm (thickness)) that had been chemical conversion-treated (product name PALBOND #3020, manufactured by Nihon Parkerizing Co., Ltd., phosphate zinc treatment agent), was electrodeposition-coated to a dry film thickness of 15 μm using each of the cationic electrodeposition coating materials obtained in the Examples and Comparative Examples, and then baked and dried for 20 minutes at 170° C., to obtain a test sheet (film thickness 15 μm).

Also, a target object, being a cold-rolled steel sheet (150 mm (length)×70 mm (width)×0.8 mm (thickness)) that had been chemical conversion-treated (product name PALBOND #3020, manufactured by Nihon Parkerizing Co., Ltd., phosphate zinc treatment agent), was electrodeposition-coated to a dry film thickness of 22 μm using each of the cationic electrodeposition coating materials obtained in the Examples and Comparative Examples, and then baked and dried for 20 minutes at 170° C., to obtain a test sheet (film thickness 22 μm).

<Anticorrosive Property in Flat Areas (Film Thickness 22 μm)>

The test sheet (film thickness 22 μm) was cross-cut through the coating film with a cutting knife until the base material was reached, 35° C. salt-spray-tested for 840 hours according to JIS Z-2371, and evaluated according to the criteria below based on the width of any rust or bulge on one side of the cuts.

Among the grades, A to C indicate acceptance, while D indicates rejection.

A: The maximum width of rust or bulge is no more than 2.0 mm on one side of the cuts.
B: The maximum width of rust or bulge is over 2.0 mm but no more than 3.0 mm on one side of the cuts.
C: The maximum width of rust or bulge is over 3.0 mm but no more than 3.5 mm on one side of the cuts.
D: The maximum width of rust or bulge is over 3.5 mm on one side of the cuts.

<Finish Quality (Film Thickness 15 μm)>

The coated surface of the obtained test sheet (film thickness 15 μm) was measured for surface roughness value (Ra) using Surftest 301 (product name, manufactured by Mitutoyo Corporation, surface roughness tester) with a cutoff of 0.8 mm, and the result was evaluated according to the criteria below.

The grades are as follows (A is the best):
A: Surface roughness value (Ra) is under 0.2.
B: Surface roughness value (Ra) is 0.2 or greater but under 0.24.
C: Surface roughness value (Ra) is 0.24 or greater but under 0.30.
D: Surface roughness value (Ra) is 0.30 or greater but under 0.35.
E: Surface roughness value (Ra) is 0.35 or greater.

<Finish Quality (Film Thickness 22 μm)>

The coated surface of the obtained test sheet was measured for surface roughness value (Ra) using Surftest 301 (product name, manufactured by Mitutoyo Corporation, surface roughness tester) with a cutoff of 0.8 mm, and the result was evaluated according to the criteria below.

Among the grades, A to D indicate acceptance, while E indicates rejection.

A: Surface roughness value (Ra) is under 0.2.
B: Surface roughness value (Ra) is 0.2 or greater but under 0.24.
C: Surface roughness value (Ra) is 0.24 or greater but under 0.30.
D: Surface roughness value (Ra) is 0.30 or greater but under 0.35.
E: Surface roughness value (Ra) is 0.35 or greater.

What is claimed is:

1. A cationic electrodeposition coating composition comprising an amino group-containing epoxy resin (A), a blocked polyisocyanate compound (B), and crosslinked epoxy resin particles (C), wherein:

the crosslinked epoxy resin particles (C) are contained by 0.1 to 40 parts by mass relative to a total mass in solids content of the amino group-containing epoxy resin (A) and blocked polyisocyanate compound (B);

a number-average molecular weight of the crosslinked epoxy resin particles (C) is 150 or greater but under 10,000; and a volume-average particle size of the crosslinked epoxy resin particles (C) is 30 to 1,000 nm, said number-average molecular weight being a value determined as measured by a method wherein the crosslinked epoxy resin particles (C) are diluted with N,N'-dimethylformamide to 1% by mass in solids content concentration and let stand stationary for 24 hours at room temperature; next, undissolved components are filtered out; and the number-average molecular weight is measured by gel permeation chromatography (GPC).

2. The cationic electrodeposition coating composition according to claim 1, wherein a percentage of undissolved components, which are crosslinked components, in the crosslinked epoxy resin particles (C) is 10% by mass or higher, said percentage of undissolved components (crosslinked components) being a value determined as measured by a method wherein the crosslinked epoxy resin particles (C) are diluted with N,N'-dimethylformamide to 1% by mass in solids content concentration and let stand stationary for 24 hours at room temperature; next, undissolved components (crosslinked components) are filtered out using a GPC Maishori Disk filter (pore size: 0.2 microns), and residues are dried under conditions of 130° C.×3 hours and then measured for mass in solids content, where the percentage (% by mass) of undissolved components (crosslinked components) can be obtained by the formula below:

Percentage (% by mass) of undissolved components (crosslinked components)=$A/B$×100 where

A: mass of filtration residues in solids content

B: mass of diluted solution of crosslinked epoxy resin particles (C) of 1% by mass in solids content/100.

3. The cationic electrodeposition coating composition according to claim 1, wherein the volume-average particle size of the crosslinked epoxy resin particles (C) is 100 nm to 800 nm.

4. The cationic electrodeposition coating composition according to claim 1, wherein an absorbance of the crosslinked epoxy resin particles (C) at a wavelength of 400 nm is 0.05 or higher, said absorbance being measured by a method wherein the crosslinked epoxy resin particles (C) are diluted with N,N'-dimethylformamide to 1% by mass in solids content concentration and let stand stationary for 24 hours at room temperature; subsequently, their absorbance at a wavelength of 400 nm is measured with a spectrophotometer.

5. The cationic electrodeposition coating composition according to claim 1, wherein the crosslinked epoxy resin particles (C) are a reaction product of an amino group-containing epoxy resin (C-1) and an epoxy resin (C-2).

6. The cationic electrodeposition coating composition according to claim 5, wherein the amino group-containing epoxy resin (C-1) is a reaction product of an epoxy resin (C-1-1) and an amine compound (C-1-2) and in that the amine compound (C-1-2) contains a ketiminated amine compound (C-1-2-1) by 2% by mol or higher but under 40% by mol.

7. The cationic electrodeposition coating composition according to claim 1, wherein a high molecular fraction of the crosslinked epoxy resin particles (C), as measured as a percentage of peak area of molecular weight 100,000 or higher, is under 40%.

8. The cationic electrodeposition coating composition according to claim 1, wherein the amino group-containing epoxy resin (A) is a reactant of a bisphenol A type epoxy resin and an amine compound.

9. A coating method for electrodeposition-coating a metal target object by immersing it in an electrodeposition coating material bath comprising the cationic electrodeposition coating composition according to claim 1.

10. A method for manufacturing a coated article, including a step in which a coating film is formed by the coating method according to claim 9 and then heated and cured.

11. The cationic electrodeposition coating composition according to claim 2, wherein the volume-average particle size of the crosslinked epoxy resin particles (C) is 100 nm to 800 nm.

12. The cationic electrodeposition coating composition according to claim 2, wherein an absorbance of the crosslinked epoxy resin particles (C) at a wavelength of 400 nm is 0.05 or higher, said absorbance being a value determined as measured by a method wherein the crosslinked epoxy resin particles (C) are diluted with N,N'-dimethylformamide to 1% by mass in solids content concentration and let stand stationary for 24 hours at room temperature; subsequently, their absorbance at a wavelength of 400 nm is measured with a spectrophotometer.

13. The cationic electrodeposition coating composition according to claim 2, wherein the crosslinked epoxy resin particles (C) are a reaction product of an amino group-containing epoxy resin (C-1) and an epoxy resin (C-2).

14. The cationic electrodeposition coating composition according to claim 2, wherein a high molecular fraction of the crosslinked epoxy resin particles (C), as measured as a percentage of peak area of molecular weight 100,000 or higher, is under 40%.

15. The cationic electrodeposition coating composition according to claim 2, wherein the amino group-containing epoxy resin (A) is a reactant of a bisphenol A type epoxy resin and an amine compound.

16. A coating method for electrodeposition-coating a metal target object by immersing it in an electrodeposition coating material bath comprising the cationic electrodeposition coating composition according to claim 2.

17. The cationic electrodeposition coating composition according to claim 3, wherein an absorbance of the crosslinked epoxy resin particles (C) at a wavelength of 400 nm is 0.05 or higher, said absorbance being a value determined as measured by a method wherein the crosslinked epoxy resin particles (C) are diluted with N,N'-dimethylformamide to 1% by mass in solids content concentration and let stand stationary for 24 hours at room temperature; subsequently, their absorbance at a wavelength of 400 nm is measured with a spectrophotometer.

18. The cationic electrodeposition coating composition according to claim 3, wherein the crosslinked epoxy resin particles (C) are a reaction product of an amino group-containing epoxy resin (C-1) and an epoxy resin (C-2).

19. The cationic electrodeposition coating composition according to claim 3, wherein a high molecular fraction of the crosslinked epoxy resin particles (C), as measured as a percentage of peak area of molecular weight 100,000 or higher, is under 40%.

20. The cationic electrodeposition coating composition according to claim 3, wherein the amino group-containing epoxy resin (A) is a reactant of a bisphenol A type epoxy resin and an amine compound.

* * * * *